United States Patent
Yao et al.

(10) Patent No.: US 12,337,658 B2
(45) Date of Patent: Jun. 24, 2025

(54) HEAT PUMP WITH COMPRESSOR HEAT BOOST

(71) Applicant: Rivian IP Holdings, LLC, Plymouth, MI (US)

(72) Inventors: Chengcai Yao, Northville, MI (US); Graciela Morales Martinez, Irvine, CA (US); Jing He, Novi, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 167 days.

(21) Appl. No.: 18/118,602

(22) Filed: Mar. 7, 2023

(65) Prior Publication Data

US 2024/0300297 A1    Sep. 12, 2024

(51) Int. Cl.
   *B60H 1/00*    (2006.01)

(52) U.S. Cl.
   CPC ..... *B60H 1/00921* (2013.01); *B60H 1/00278* (2013.01); *B60H 2001/00928* (2013.01)

(58) Field of Classification Search
   CPC ............ B60H 1/00921; B60H 1/00278; B60H 2001/00928; B60H 2001/00307; B60H 2001/00949
   See application file for complete search history.

(56) References Cited

U.S. PATENT DOCUMENTS

| | | | |
|---|---|---|---|
| 2021/0061067 A1* | 3/2021 | Kim | B60H 1/3213 |
| 2022/0126646 A1* | 4/2022 | He | B60H 1/00278 |
| 2022/0305883 A1* | 9/2022 | Ishizeki | B60H 1/00007 |
| 2023/0019047 A1* | 1/2023 | Kyuto | F25B 41/20 |
| 2023/0137140 A1* | 5/2023 | Yamashita | B60H 1/00921 |
| | | | 62/244 |

* cited by examiner

*Primary Examiner* — Emmanuel E Duke
(74) *Attorney, Agent, or Firm* — Haley Guiliano LLP

(57) ABSTRACT

A system includes a compressor configured to compress a refrigerant, a plurality of control valves configured to control a flow of the refrigerant in a vehicle, and control circuitry. The control circuitry is coupled to the plurality of control valves and is configured to achieve a first configuration of the plurality of control valves wherein the refrigerant is recirculated by the compressor to increase a compressor outlet pressure. When the compressor outlet pressure reaches a predetermined threshold, the system achieves a second configuration of the plurality of control valves wherein the refrigerant is circulated to transfer heat to one or more thermal loads.

18 Claims, 10 Drawing Sheets

HEAT PUMP WITH COMPRESSOR HEAT BOOST

INTRODUCTION

The present disclosure is directed to a refrigerant system for an electric vehicle, and more particularly to the use of a compressor to provide a heat boost.

SUMMARY

A vehicle may include a heat pump used as a thermal management system to improve real world drive range of electric vehicles due to its high efficiency and holistic management of energy sources. Improvement in the use of heat pump technology may allow higher efficiency, better capability, and lower cost. In some embodiments, the present disclosure is directed to a design that integrates cabin, battery, and power electronics cooling loops and provides a cost-competitive solution for holistic thermal management in electric vehicles. For example, while some systems only operate satisfactory above roughly −15° C., the systems and methods of the present disclosure enable a compressor heat boost process to support cold ambient operation without supplemental heat sources. For example, the system is capable of providing cabin heating, energy storage system (ESS) heating, or simultaneous cabin and ESS heating without coolant-side heat sources. In a further example, the system may be capable of an operating range down to −30° C. or lower, and facilitates reduction or elimination of a high voltage electrical heater.

In some embodiments, the present disclosure is directed to a system that includes a compressor configured to compress a refrigerant, a plurality of control valves configured to control a flow of the refrigerant in a vehicle, and control circuitry coupled to the plurality of control valves. In some embodiments, the control circuitry is configured to achieve a first configuration of the plurality of control valves, and then, when the compressor outlet pressure reaches a predetermined threshold, achieve a second configuration of the plurality of control valves. In the first configuration, the refrigerant is recirculated by the compressor to increase a compressor outlet pressure, and in the second configuration, the refrigerant is circulated to transfer heat to one or more thermal loads.

In some embodiments, the present disclosure is directed to a system that includes a heat pump system configured to operate using a refrigerant in a vehicle and control circuitry. In some embodiments, the control circuitry is configured to receive an indication to provide heat to at least one subsystem, achieve a first configuration of the heat pump system in response to the indication, and then when the pressure reaches a predetermined threshold, achieve a second configuration of the heat pump system. In the first configuration, the refrigerant is recirculated to increase a pressure of the heat pump system, and in the second configuration the refrigerant is circulated to transfer heat to the at least one subsystem of the vehicle. In some embodiments, the heat pump system includes a compressor configured to compress the refrigerant; a plurality of control valves configured to achieve an open state, a closed, and a variable expansion throttling state; a plurality of heat exchangers configured to provide heat transfer with a cabin air system and a battery system; and an accumulator comprising a volume configured to store the refrigerant. In some embodiments, the system includes non-transitory computer-readable media configured to store computer instructions for managing the heat pump system and components thereof such as the compressor, control valves, and heat exchangers (e.g., using duct doors, pumps, blower fans, shutters, or other suitable actuators or devices).

In some embodiments, in the first configuration, the refrigerant flows along a path including the compressor, two heat exchangers configured to not heat cabin air in the first configuration, and an accumulator. In some embodiments, in the first configuration, the refrigerant flows along a path including the compressor, a heat exchanger configured to not heat cabin air in the first configuration, a battery system heat exchanger, and an accumulator. In some embodiments, in the first configuration, the refrigerant flows along a path including a first control valve of the plurality of control valves that is fully open, and a second control valve of the plurality of control valves that is partially open to generate a pressure drop in the refrigerant.

In some embodiments, in the second configuration, the refrigerant flows along a path including a first heat exchanger configured to optionally heat cabin air, a first subpath including a second heat exchanger that transfers heat from the refrigerant to the cabin air, and a second subpath parallel to the first subpath and including a third heat exchanger (e.g., a battery system heat exchanger). In some embodiments, in the second configuration, the refrigerant flows along a path including a first heat exchanger, a first subpath including a second heat exchanger, and a second subpath parallel to the first subpath and including a third heat exchanger that transfers heat from the refrigerant to a battery system of the vehicle. In some embodiments, in the second configuration, the refrigerant flows along a path including a first heat exchanger, a first subpath including a second heat exchanger that transfers a first amount of heat from the refrigerant to cabin air, and a second subpath parallel to the first subpath and including a third heat exchanger that transfers a second amount of heat from the refrigerant to a battery system of the vehicle. In some embodiments, in the second configuration, the refrigerant flows along a first subpath including two control valves of the plurality of control valves arranged on either side of a first heat exchanger, and along a second subpath parallel to the first subpath that includes another two control valves of the plurality of control valves arranged on either side of a second heat exchanger. In some embodiments, in the second configuration, the refrigerant flows along a path including a first control valve and a second control valve of the plurality of control valves that are fully open, and a third control valve and a fourth control valve of the plurality of control valves that are partially open to generate a pressure drop in the refrigerant.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

An electric vehicle may include subsystems that require cooling, heating, or both. Accordingly, the electric vehicle may include a refrigerant-based cooling and heating architecture. In some embodiments, the present disclosure is directed to systems and methods for thermal management of cooling, heating, or both of subsystems of an electric vehicle. For example, a compressor is used to generate heat for use in providing heat to a cabin, battery system, or other suitable system. Control valves are used to direct the flow of refrigerant to achieve a warm-up process and then transition to a heating process.

In some embodiments, a vehicle includes a heat pump system that integrates cabin, battery, and power electronics loops and provides an energy efficient and cost competitive solution for holistic thermal management. For example, the system may receive an indication to begin heating one or more subsystems of a vehicle. In response to the indication, the system may begin recirculating refrigerant to reach a predetermined state, based on a temperature, pressure, density, any other suitable property, or any combination thereof, corresponding to any suitable point in the flow (e.g., pre or post compressor, accumulator, or any other suitable location). Once refrigerant is heated from the recirculation (e.g., from the input work to the compressor being converted to an increase in enthalpy), the system then controls one or more control valves to begin circulating the refrigerant to transfer heat to the one or more subsystems. To illustrate, by first recirculating the refrigerant to increase temperature, the system may be able to provide heat to one or more other systems even when the environmental temperature is low (e.g., −15° C. or less).

Figure 1:
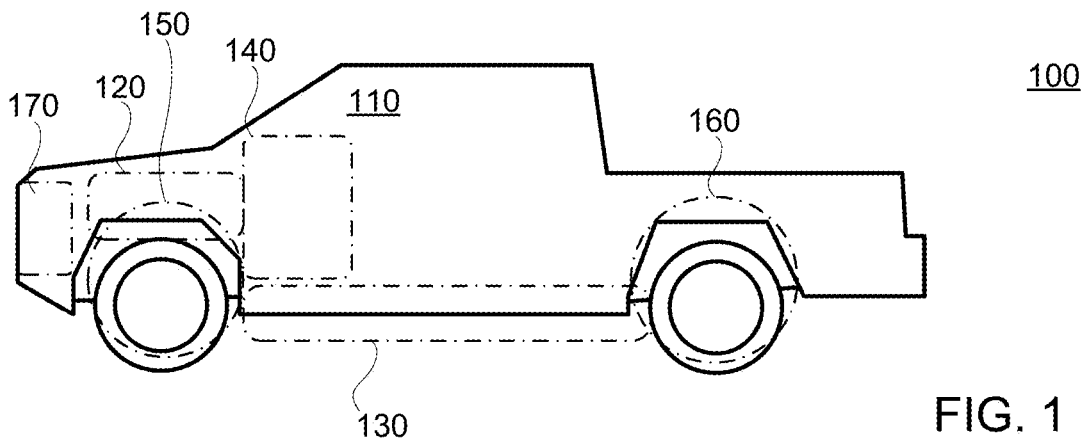
FIG. 1 shows a block diagram of an illustrative vehicle having cooling and heating loads, in accordance with some embodiments of the present disclosure.

FIG. 1 shows a block diagram of illustrative vehicle 100 having cooling and heating loads, in accordance with some embodiments of the present disclosure. As illustrated, vehicle 100 includes control system 120, battery system 130, cabin air system 140 for conditioning cabin 110, drive unit 150, drive unit 160, and refrigerant system 170, in accordance with some embodiments of the present disclosure. Control system 120 includes control circuitry that is coupled to sensors, actuators, interfaces, and any other suitable components to control one or more systems. In some embodiments, control system 120 includes a thermal management system such as, for example, a thermal refrigeration system or heat pump system that includes a compressor, a condenser (e.g., implemented as one or more heat exchangers), valving (e.g., controllable and/or fixed) and one or more evaporator units or otherwise heat exchangers, with a working fluid (e.g., any suitable refrigerant, coolant, or other fluid) for achieving a cooling process, a heating process, or both. Control system 120 may include control circuitry for monitoring sensor signals, generating control signals, executing computer readable instructions, receiving inputs, or a combination thereof. Battery system 130 (e.g., also referred to as an energy storage system or ESS) may include a plurality of battery cells, enclosures, power electronics (e.g., a DC-DC converter, switches), and a battery thermal management system having a liquid coolant or air that receives heat from the battery cells. The battery thermal management system may include a pump or compressor, a radiator, a heat exchanger, a manifold, piping, hosing, tubing, fittings, control valving, sensors and other instrumentation, controllers, or any suitable combination thereof. Cabin air system 140 is configured to provide conditioned air to cabin 110 (e.g., an occupant compartment or zones thereof). For example, cabin air system 140 may be configured to provide cabin cooling (e.g., air conditioning), heating, defrosting, venting, or a suitable combination thereof. Cabin air system 140 may include a blower fan, ducting, plenums, dampers or diversion valves, filters, intakes, one or more input interfaces (e.g., knobs, hard buttons, soft buttons, touchscreen interfaces, voice interfaces), a controller, any other suitable components, or any combination thereof. Drive units 150 and 160 may each include motors, gearing, bearings, gearbox housings, cooling jackets, power electronics (e.g., a DC-AC converter, inverter, switches, or other components), any other suitable components, or any combination thereof. For example, each of drive units 150 and 160 may include an inverter, electric motor, and a gearbox for providing torque to a respective wheel or drive axis of the electric vehicle. Other loads (e.g., refrigerant system 170) may include control modules, processors, electronics, mechanical components having cooling jackets or passages, any other suitable components that generate or otherwise transfer heat to the cooling system, or any combination thereof. It will be understood that a "working fluid" refers to a fluid in the context of a system, component, cycle, fluid path (e.g., a trajectory of a fluid as it flows among components and systems), and a "fluid" may include any suitable gas or vapor (e.g., air, water vapor, refrigerant vapor), liquid (e.g., water, coolant, condensed-phase refrigerant), mixture (e.g., single phase or multiphase), slurry, or combination thereof.

Figure 2:
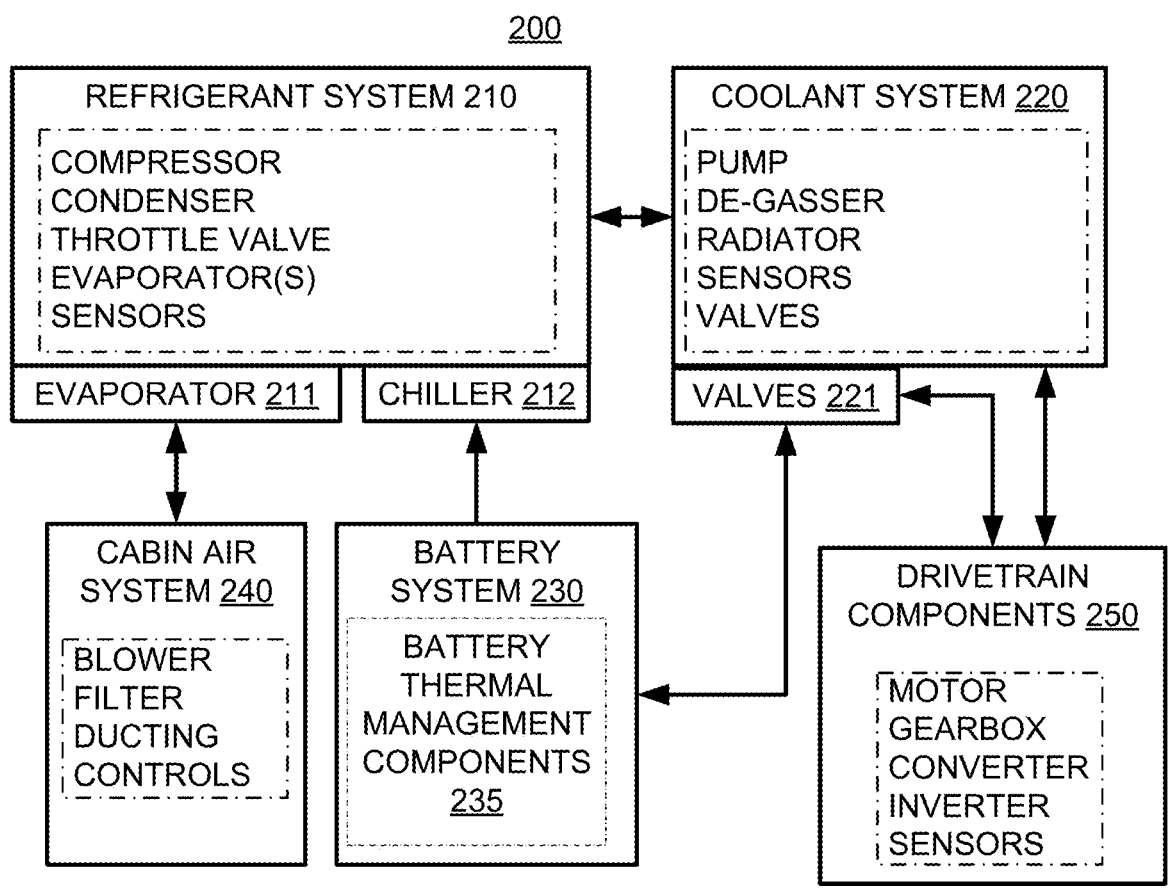
FIG. 2 shows a block diagram of illustrative cooling systems of an electric vehicle, in accordance with some embodiments of the present disclosure.

FIG. 2 shows a block diagram of illustrative thermal management systems of an electric vehicle, in accordance with some embodiments of the present disclosure. The thermal management systems are arranged as part of thermal architecture 200, and include refrigerant system 210, coolant system 220, drivetrain components 250, battery system 230 (e.g., which includes battery thermal management components 235, as illustrated, and a plurality of batteries), and cabin air system 240. To illustrate, refrigerant system 210 may interface to cabin air system 240 via evaporator 211, to battery system 230 via chiller 212 and/or a heat exchanger (e.g., and via battery thermal management components 235), and to drivetrain components 250 via coolant system 220 and valves 221. To illustrate further, drivetrain components 250 and battery system 230 may interface to coolant system 220 (e.g., coolant is provided to each system). In some embodiments, refrigerant system 210 may be configured to provide air conditioning, to act as a heat pump, or otherwise facilitate heat transfer to and from heat sources and sinks.

Figure 3:
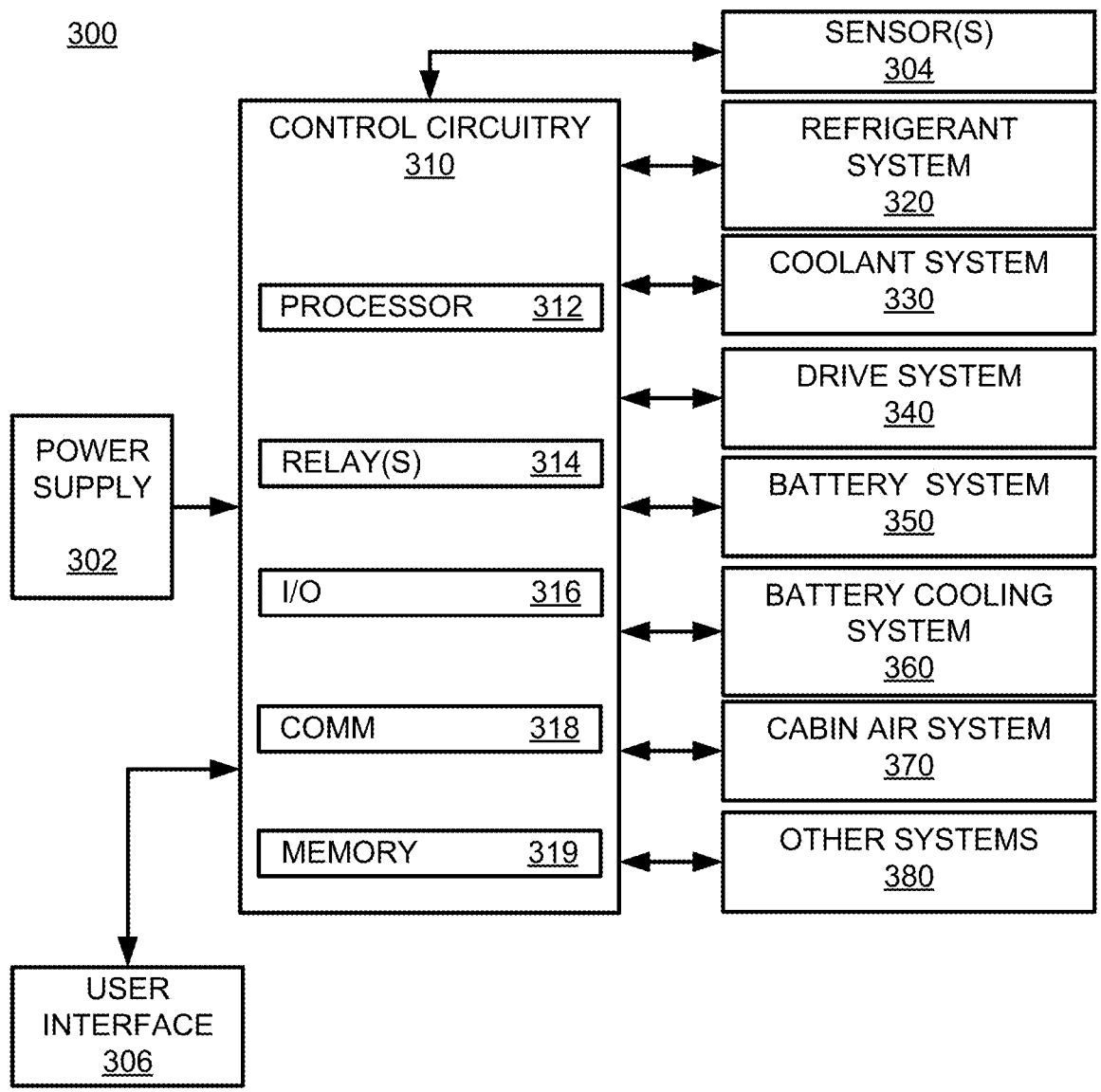
FIG. 3 shows a block diagram of an illustrative system for controlling heat transfer for an electric vehicle, in accordance with some embodiments of the present disclosure.

In an illustrative example, a vehicle controller may monitor and control battery system 230, and determine when cooling is needed (e.g., based on ambient conditions, driving conditions, or both). Additionally, an occupant may adjust controls of cabin air system 240 to provide cooled air to an occupant compartment. A control system, as illustrated in FIG. 3, may be configured to manage cooling, heating, or a combination thereof for any or all of battery system 230, drivetrain components 250 (e.g., which may include a drive system and/or drive cooling system), and cabin air system 240 based on the varying demands of each system. Refrigerant system 210, as illustrated, includes a compressor, a condenser (e.g., implemented as one or more heat exchangers), a throttle valve (e.g., one or more controllable valves having adjustable orifices and controllable between opened and closed), an evaporator (e.g., implemented as one or more heat exchangers), and sensors. Coolant system 220, as illustrated, includes one or more pumps, de-gassers, radiators, sensors, and valves. Drivetrain components 250, as illustrated, includes drive units (e.g., motors, gearboxes, and mechanisms), DC-DC converters, DC-AC inverters, and sensors, any or all of which may include coolant passages that interface to coolant system 220. In an illustrative example, drivetrain components 250 may include a plurality of drive units, a plurality of electric motors (e.g., four electric motors, corresponding to a respective wheel of a vehicle), or otherwise one or more systems for generating torque at wheels of the vehicle. Battery thermal management components 235 of battery system 230 may include one or more pumps, valves, cooling jackets (e.g., interfacing to other components of battery system 230), sensors, any other suitable components, or any combination thereof. Cabin air system 240, as illustrated, may include one or more blowers, filters, ducting, and controls for providing conditioned air to an occupant compartment or zones thereof.

Although illustrated as separate, refrigerant system 210, coolant system 220, drivetrain components 250, battery system 230, and cabin air system 240 may overlap, be interfaced to each other via one or more components (e.g., valves, fittings, conduits, cooling jackets, heat exchangers such as chillers or evaporators), or otherwise be modified from illustrative thermal architecture 200. Further, the boundary delineating each system is merely illustrative. For example, battery thermal management components 235 may be illustrated as integrated as part of battery system 230. In a further example, heat exchangers (e.g., evaporators, chillers) for exchanging heat among systems may be illustrated as being part of either system or both systems. Accordingly, system delineations illustrated herein are merely exemplary for purposes of discussion. In some embodiments, battery system 230 (e.g., or battery thermal management components 235 thereof) includes an in-line heater for providing heat to battery system 230.

FIG. 3 shows a block diagram of illustrative system 300 for controlling heat transfer for an electric vehicle, in accordance with some embodiments of the present disclosure. For example, system 300 may be included as part of vehicle 100 of FIG. 1, or thermal architecture 200 of FIG. 2. As illustrated, system 300 includes control circuitry 310, sensors 304, user interface 306, power supply 302, refrigerant system 320, coolant system 330, drive system 340, battery system 350, battery cooling system 360, cabin air system 370, and any other (suitable) systems 380 in accordance with some embodiments of the present disclosure. Illustrative control circuitry 310 includes processor 312, one or more relays 314 (hereinafter referred to as relay(s) 314), input/output 316 (hereinafter referred to as I/O 316), communication hardware 318 (hereinafter referred to as COMM 318), and memory 319.

Control circuitry 310 may include hardware, software, or both, implemented on one or more modules configured to provide control of a thermal management system. In some embodiments, processor 312 includes one or more microprocessors, microcontrollers, digital signal processors, programmable logic devices, field-programmable gate arrays (FPGAs), application-specific integrated circuits (ASICs), or any suitable combination thereof. In some embodiments, processor 312 is distributed across more than one processor or processing units. In some embodiments, control circuitry 310 executes instructions stored in memory (e.g., non-transitory computer readable media) for managing cooling of a cabin and a battery system. In some embodiments, memory 319 is an electronic storage device that is part of control circuitry 310. For example, memory may be configured to store electronic data, computer instructions, applications, firmware, or any other suitable information. In some embodiments, memory 319 includes random-access memory, read-only memory, hard drives, optical drives, solid state devices, or any other suitable memory storage devices, or any combination thereof. For example, memory may be used to launch a start-up routine. In some embodiments, memory 319 includes non-transitory computer-readable media that include computer executable instructions for controlling heating and cooling (e.g., processes 500 and 600 of FIGS. 5-6).

In some embodiments, control circuitry 310 is powered by power supply 302. In some embodiments, power supply 302 includes a car battery (e.g., a 12 V lead acid battery), a DC-DC converter, an AC power supply (e.g., generated by suitably inverting a DC power supply), any other power supply, any corresponding components (e.g., terminals, switches, fuses, and cables), or any combination thereof. In some embodiments, power supply 302 supplies power to refrigerant system 320, coolant system 330, drive system 340, battery system 350, battery cooling system 360, cabin air system 370, and any other suitable systems 380, or any combination thereof.

In some embodiments, user interface 306 includes a push button, a toggle switch, a turnable knob, a display screen (e.g., a touch screen), a key fob, a key-lock combination, any other suitable system or component for receiving input from a user or providing output to a user, or any combination thereof. In some embodiments, user interface 306 includes a touchscreen on the dash of a vehicle, configured to receive input from the user, and provide a display to the user. In some embodiments, user interface 306 includes one or more buttons that are selectable by a user. For example, the one or more buttons may include a button coupled to a switch, a button on a touchpad, any other suitable button that may be used by a user to make a selection, or any combination thereof. In some embodiments, user interface 306 includes one or more turnable knobs that a user may turn to adjust a temperature setting, blower setting, drive mode, or another suitable setting.

In some embodiments, sensor(s) 304 include one or more temperature sensors (e.g., at least one thermocouple, thermistor, resistance temperature detector, or optical sensor), pressure sensors (e.g., piezo or strain-based transducers), speed sensors (e.g., a rotary encoder), position sensors (e.g., a rotary encoder), current sensors (e.g., of a compressor motor), flow sensors, any other suitable sensors, or any combination thereof. For example, sensor(s) 304 may be used to measure temperature of a component (e.g., a heat exchanger, a chiller, a compressor), a fluid (e.g., air, coolant, refrigerant, or any other suitable gas/vapor, liquid, mixture, slurry, or combination thereof), or a combination thereof. In a further example, sensor(s) 304 may be used to measure pressure or a difference in pressure of a fluid (e.g., air, coolant, or refrigerant, or any other suitable gas/vapor, liquid, mixture, slurry, or combination thereof). In a further example, sensor(s) 304 may be used to measure a flow rate in air, coolant, or refrigerant (e.g., to determine a cooling or heating rate). Sensor(s) 304 is also referred to herein as sensors 304, and accordingly may include one or more sensors of any suitable type or types.

Coolant system 330 may be the same as, similar to, or included as part of coolant system 220 of FIG. 2. In some embodiments, refrigerant system 320, having a refrigerant as a working fluid, includes a compressor, condenser, one or more control valves (e.g., throttle valves), and at least one heat exchanger (e.g., a chiller and/or evaporator, or interface thereto) that may act as a heat pump and/or refrigeration cycle. Refrigerant system 320 may be coupled to coolant system 330, battery cooling system 360, cabin air system 370, or other suitable systems 380 by a single heat exchanger (e.g., an evaporator), two or more heat exchangers coupled in series and/or parallel, or any other suitable heat exchanger configuration in accordance with the present disclosure.

Drive system 340 may be the same as, similar to, or include drivetrain components 250 of FIG. 2, or drive units 150 and 160 of FIG. 1. For example, drive system 340 may include one or more front drive units, rear drive units, or both, which may each include a motor coupled via a gearset to an output shaft that corresponds to a wheel or a drive axis of the vehicle. To illustrate, each drive unit may include a motor coupled to a gearbox having a lubricating oil system and cooling passages (e.g., for interfacing to coolant system 330), wherein the motor is electrically coupled to an inverter or otherwise power electronics (e.g., a motor drive). In some embodiments, drive system 340 may include, or otherwise be interfaced to, a drive cooling system that may include one or more pumps, valves, fittings, conduits, heat exchangers, sensors, any other suitable components, or any combination thereof. To illustrate, drive system 340 may interface to coolant system 330, which may include the drive cooling system. In an illustrative example, drive system 340 may include a plurality of electric motors (e.g., more than one electric motor such as four electric motors), which may be configured to generate heat. In some embodiments, drive system 340 may include more than electric motor, and accordingly heat may be generated in the electric motors (e.g., relatively more heat than a single motor). For example, because the vehicle may include a plurality of electric motors and corresponding power electronics (e.g., for generating current in the electric motors), heat may be generated in each of the electric motors (e.g., under normal operation and during application of excess current to generate further heat or excess heat). To illustrate, control circuitry 310 may be configured to generate control signals for each electric motor of drive system 340 (e.g., four sets of control signals for a respective four electric motors), of which all or some may generate heat that may be transferred to a battery system or dissipated by a radiator (e.g., depending on the operating mode/configuration).

Battery cooling system 360 may be included as part of, or otherwise interfaced to, battery system 350. In some embodiments, battery cooling system 360 includes a liquid circulation system for cooling one or more battery modules, each including a plurality of battery cells, power electronics, chargers, and/or other suitable components. In some embodiments, control circuitry 310 or another suitable control system is configured to adjust the flow rate, pressure, or both, provided by a pump of battery cooling system 360. For example, the pump may be controlled to increase flow rate as heat load increases (e.g., for a rotary pump coupled to at motor, the rotation rate may be increased by increasing motor current/rotation rate). In a further example, battery cooling system 360 may include one or more control valves for diverting, adjusting, or otherwise controlling flow based on the heat load. To illustrate, as the current demand increases from the battery pack, the cooling requirement (e.g., power) may also increase to maintain the battery pack temperature within an operable range (e.g., below a temperature limit to avoid overheating). For example, the heat rejection of the heat load may depend on driving conditions (e.g., current demand at electric motors of the drivetrain of the vehicle), ambient conditions, one or more temperature limits (e.g., of battery cells, battery modules, battery coolant temperature, power electronics temperature, or any other suitable temperature), any other suitable criterion, or any combination thereof. In some circumstances (e.g., cold weather climates), battery cooling system 360 may be used to provide heating to battery system 350 to warm up the battery cells to a desired operating temperature. In some embodiments, an optional positive temperature coefficient (PTC) heater may be used to heat the battery alone or in combination with using the heat from the power electronics and/or electric machines (e-machines).

Cabin air system 370 may be the same as or similar to, or included as part of, cabin air system 140 of FIG. 1, or cabin air system 240 of FIG. 2. In some embodiments, cabin air system 370 includes an air circulation system for providing temperature-controlled air to an occupant compartment of a vehicle. For example, cabin air system 370 may include a blower, configured to blow air through, and exchange heat with, one or more heat exchangers.

Other systems 380 may include auxiliary systems (e.g., a user-controlled cooler for beverages), controllers or modules (e.g., having processors), electronics, display devices, or other suitable systems that may interface to refrigerant system 320 or coolant system 330.

Illustrative system 300 of FIG. 3, or aspects thereof, may be used to control any suitable cooling system disclosed herein and implement any suitable method disclosed herein, in accordance with the present disclosure. In some embodiments, not all components shown in FIG. 3 need be included in system 300. For example, in some embodiments, control circuitry 310 may be configured to control coolant system 220 and refrigerant system 320, while battery cooling system 360 and cabin air system 370 are controlled by other control circuitry (e.g., a separate processor and/or control algorithm). In some embodiments, control circuitry 310 is configured to determine an operation mode such as default mode, mixed mode, cooling mode, heating mode, or any other suitable mode (e.g., which defines how the system operates). For example, control circuitry 310 may execute computer readable instructions stored on non-transitory computer readable media to select from among operating modes (e.g., based on input from user interface 206), retrieve reference information (e.g., from memory), generate and transmit control signals to any system of system 300, receive and process sensor signals, or a combination thereof. System 300, or control circuitry 310 thereof, may be referred to herein as a control system (e.g., for controlling thermal management of an electric vehicle). It will be understood that a mode, as referred to herein, corresponds to any suitable form of operation for providing heating, cooling, or a combination thereof.

Figure 4:
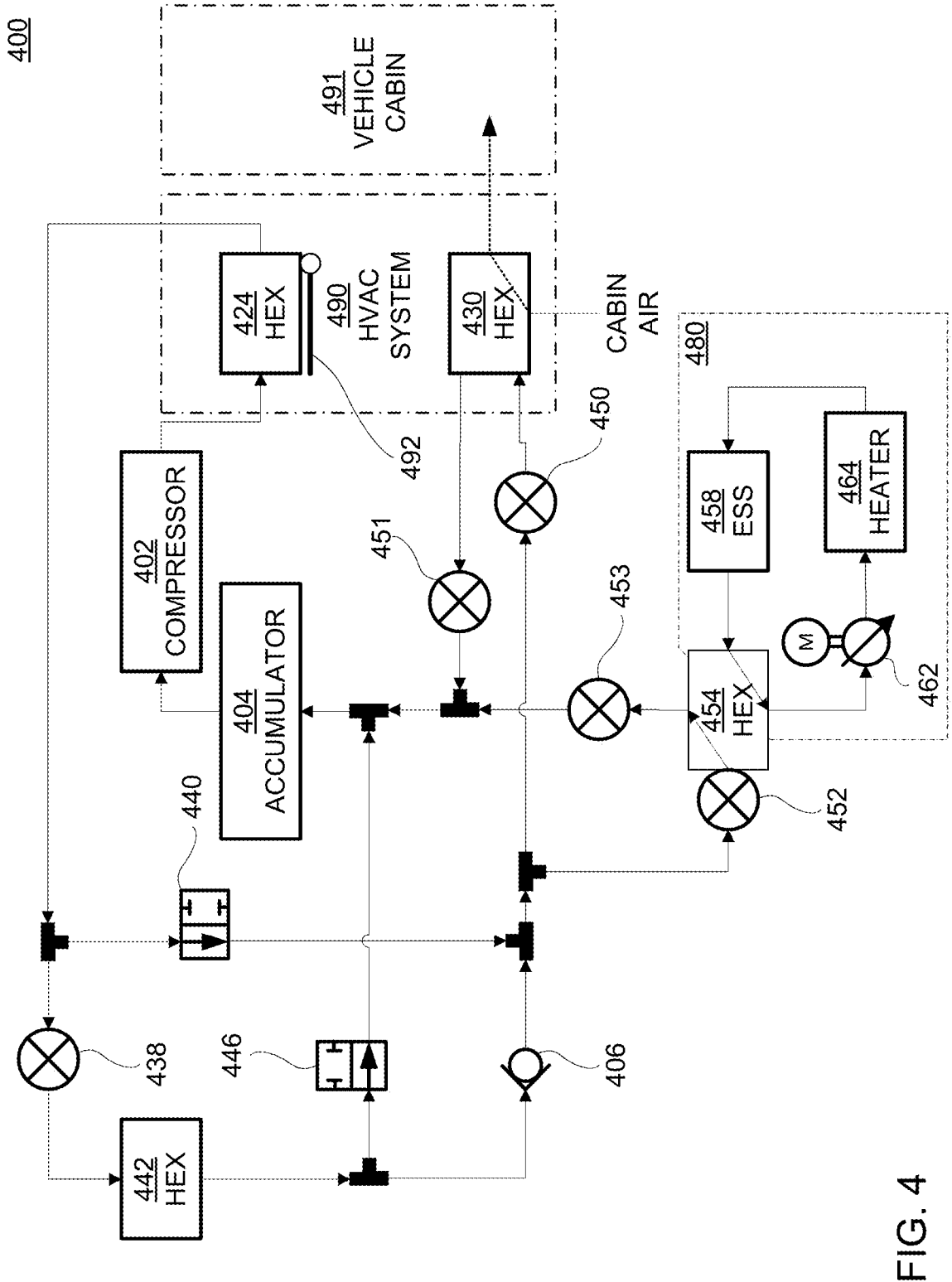
FIG. 4 is a block diagram of a system of a vehicle, in accordance with some embodiments of the present disclosure.

FIG. 4 shows system 400 of a vehicle (e.g., having vehicle cabin 491), in accordance with some embodiments of the present disclosure. System 400 represents an example of thermal architecture 200 of FIG. 2 (e.g., as included in vehicle 100 of FIG. 1). For example, system 400 also represents an example of aspects of system 300 of FIG. 3 (e.g., the components of system 400 may be controlled and/or monitored by control circuitry 310). In a further example, FIGS. 7-11 illustrate configurations of system 400 as achieved by controlling components of system 400 (e.g., as disclosed by FIGS. 5-6). As illustrated, system 400 includes: compressor 402 (e.g., configured to increase temperature and pressure of a refrigerant); heat exchangers 424, 430, 442, and 454 (e.g., gas-refrigerant or liquid-refrigerant); shut-off valves (SOV) 440 and 446 (e.g., configured to achieve an opened or closed state); check valve 406 (e.g., configured to limit refrigerant flow to one direction); energy storage system (ESS) 458 (e.g., a battery system of the electric vehicle); control valves 438, 450, 451, 452, and 453 (e.g., electronic expansion valves, configured to achieve an open, closed, or controllable partially open state); optional heater 464 (e.g., an electric heater for warming ESS 458); and accumulator 404 (e.g., having a volume and which may be spring-loaded or include a gas volume to impart pressure to the refrigerant therein).

As illustrated, system 400 may include a coolant stream, a refrigerant stream, and air streams. For example, refrigerant is compressed by compressor 402 (e.g., powered by an electric motor, controlled by control circuitry 310) and is directed along a flow path using control valves 438, 450, 451, 452, and 453. As the refrigerant flows through heat exchangers 424, 430, 442, and 454, heat may be transferred between the refrigerant and another fluid (e.g., air or coolant), heat may be effectively prevented from being transferred with the refrigerant (e.g., the air or coolant does not receive or provide appreciable heat), or the heat transfer to or from the refrigerant may be controlled. Battery system 480 includes a coolant flow (e.g., a water-based liquid and additives, or any other suitable fluid that is cooled by or heated by the refrigerant via heat exchanger 454 (e.g., a liquid-refrigerant heat exchanger).

Battery system 480, as illustrated, includes a battery cooling system having one or more fittings, conduits (e.g., tubing, piping, hosing), valves, and pumps (e.g., pump 462 having an electric motor "M"), interfaced with or otherwise including heat exchanger 454 or a portion thereof. In some embodiments, battery system 480 includes a liquid circulation system for cooling a plurality of battery cells of ESS 458. In some embodiments, control circuitry 310 of FIG. 3, or another suitable control system, is configured to adjust the flow rate, pressure, or both, provided by pump 462. For example, pump 462 may be controlled to increase flow rate as heat load or cooling load increases (e.g., for a rotary pump coupled to at motor, the rotation rate may be increased by increasing motor current/rotation rate). In a further example, the battery cooling system of battery system 480 may include one or more control valves for diverting, adjusting, or otherwise controlling flow based on the thermal load. To illustrate, as the current demand increases from the battery pack (e.g., ESS 441), the cooling requirement in kW may also increase to maintain the battery pack temperature within an operable range (e.g., below a temperature limit to avoid overheating). For example, the heat rejection of ESS 441 may depend on driving conditions (e.g., current demand at electric motors of the drivetrain of the vehicle), ambient conditions, one or more temperature limits (e.g., of battery cells, battery modules, battery coolant temperature, power electronics temperature, or any other suitable temperature), any other suitable criterion, or any combination thereof. It will be understood that the battery cooling system may include any of the components illustrated, any other suitable components not illustrated, or any combination thereof (e.g., as illustrated and described in the context of FIGS. 2-3). In a further example, in cold weather, heat may be transferred from the refrigerant to battery system 480 via heat exchanger 454 to maintain battery temperature in an operating range (e.g., above a threshold temperature).

The vehicle includes HVAC system 490, which may be the same as or similar to, or included as part of, cabin air system 140 of FIG. 1, cabin air system 240 of FIG. 2, or cabin air system 370 of FIG. 3. In some embodiments, HVAC system 490 includes an air circulation system for providing temperature-controlled air to an occupant compartment of a vehicle. For example, HVAC system 490 may include one or more blowers, configured to blow air through, and exchange heat with, heat exchangers 424 and/or 430. In some embodiments, the blower is controlled by control circuitry 310 of FIG. 3 based on input from user interface 306 (e.g., a position of a turnable knob), input from another controller (e.g., a central controller), or input from any other suitable source. Control valves 450 and 451 control refrigerant flow and pressure drop to control heat transfer at heat exchanger 430. Door 492 (e.g., a controllable duct door controllable using control circuitry 310) controls air flow and heat transfer from refrigerant via heat exchanger 424 (e.g., if door 492 is closed, then the refrigerant does not transfer appreciable heat to the cabin air). For example, heat transfer, fluid temperature, or both may be controlled by controlling a flow rate through heat exchangers 424 and 430. It will be understood that HVAC system 490 may include any of the components illustrated, any other suitable components not illustrated, or any combination thereof.

In an illustrative example, a heat pump may operate in an air-source mode, utilizing a vapor compression cycle to absorb heat from ambient air via outside heat exchanger (e.g., similar to heat exchanger 442). The effectiveness of such a cycle decreases with ambient temp as available internal energy in the air (e.g., for heat transfer) reduces and the pressure at the inlet to the compressor drops (e.g., corresponding to low refrigerant density, low mass flow rate, and low capacity). For this reason, performance of such a heat pump may be satisfactory only above certain ambient temperatures (e.g., roughly −15° C. in some circumstances). Coolant-side heat sources, such as electrical heater 464, ESS 458, or power electronics 466, might generally be required to support colder ambient operation in such heat pump systems. However, the present disclosure is directed to an improved heat pump design that enables a compressor heat boost process to support cold ambient operation without the need to operate such coolant-side heat sources to generate or transfer heat. For example, system 400 may be capable of providing cabin heating, ESS heating, or simultaneous cabin and ESS heating. In a further example, system 400 may implement compressor heat boost to extend the useful operating range down to much colder ambient temperature (e.g., −30° C. or lower in some circumstances) and facilitates a reduction or possible elimination of high-voltage electrical heater 464 for cost and mass benefits.

Figure 5:
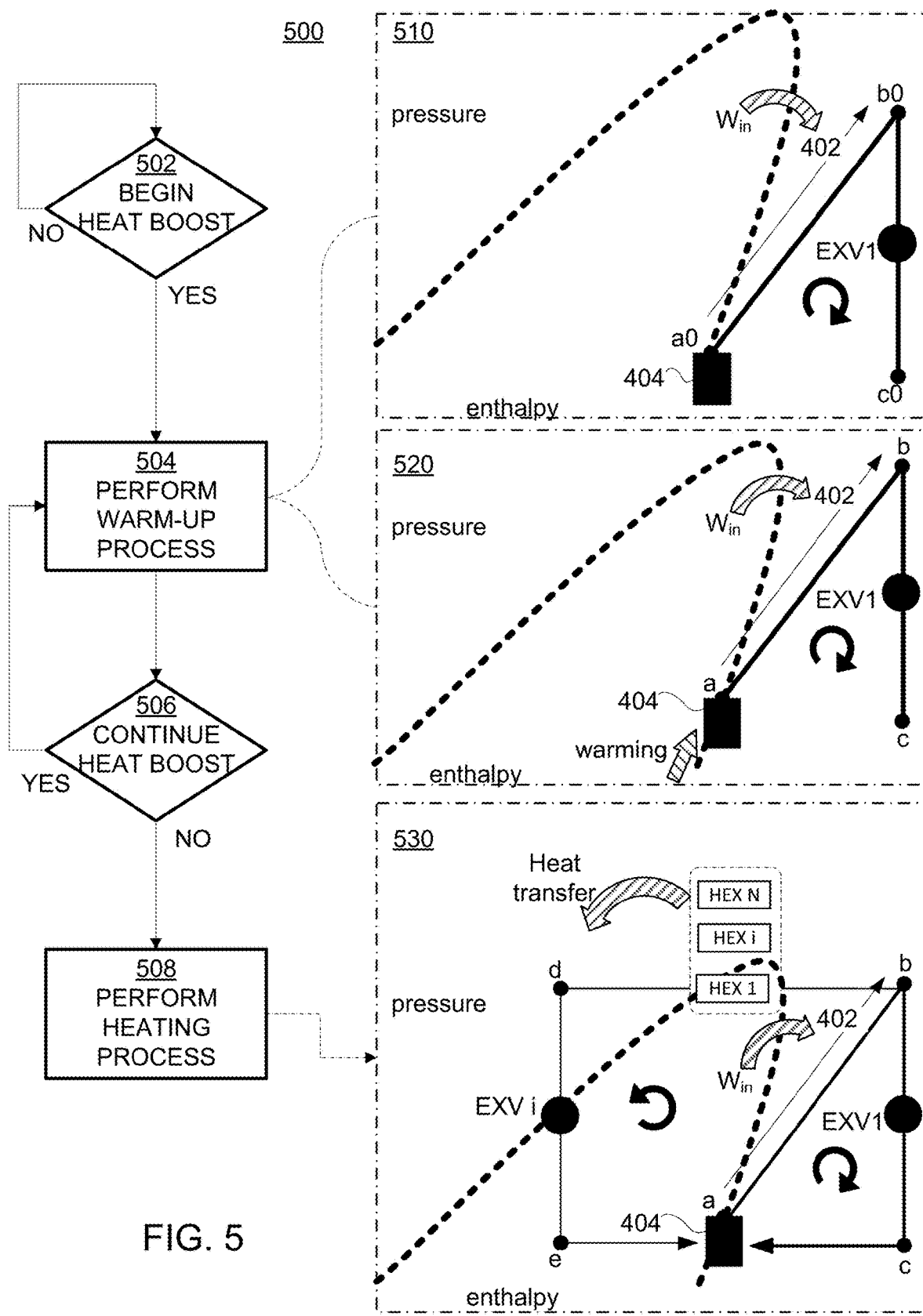
FIG. 5 is a flowchart of an illustrative process for performing compressor heat boost, with instrumentation indicators, in accordance with some embodiments of the present disclosure.

FIG. 5 is a flowchart of illustrative process 500 for performing compressor heat boost, with instrumentation indicators, in accordance with some embodiments of the present disclosure. For example, process 500 may be implemented for vehicle 100, using control system 120 or control circuitry 310 of system 300. In a further example, process 500 may be implemented to control refrigerant system 210 of FIG. 2, refrigerant system 320 of system 300, or system 400 of FIG. 4. Panels 510, 520, and 530 illustrate some aspects of process 500 in the context of a pressure/enthalpy diagram (p-H diagram) for a suitable refrigerant. Points "a0," "b0," and "c0" correspond to initial states (e.g., at or near the beginning of warming), while states "a," "b," and "c" correspond to illustrative operating states (e.g., during heating of other systems). It will be understood that points "a0" and "a" may be the same, and that points "c0" and "c" may be the same, but need not be.

Step 502 includes the system determining whether to begin heat boost. In some embodiments, the system may determine whether to begin heat boost at vehicle start-up, occupation (e.g., as sensed by a vehicle occupancy sensor), selection of a cabin air temperature at a user interface, at any other suitable time, in response to any suitable event or trigger, or any combination thereof. For example, in some embodiments, the system may determine an ambient temperature (e.g., based on a suitable temperature sensor) and then determine that heat boost is desired. In some embodiments, the system may determine a compressor outlet pressure, and if that pressure is less than a threshold $P_b$, the system may initiate compressor heat boost and proceed to step 504. The system may use any suitable criteria to determine whether to begin heat boost at step 502.

Step 504 includes the system performing a warm-up process. During the warm-up process, the system achieves a first configuration to recirculate refrigerant without substantially warming any other system. For example, at step 504, control circuitry 310 may generate a control signal to control speed, pressure increase, or other suitable operating characteristic of compressor 402 to begin to compress the refrigerant. At step 504, the system prevents appreciable heat transfer to any other system such as a cabin air system (e.g., controlling a duct door and/or air blower fan to not convect heat away from the refrigerant) or battery system (e.g., controlling a control valve or coolant pump to not convect heat away from the refrigerant) to allow the refrigerant to warm and reach a desired operating condition. For example, step 504 may include operating the heat pump system to increase heat without achieving a target temperature or operating condition corresponding to a target of another system (e.g., cabin system, battery system, or other system). At step 504, the system also controls one or more electronic expansion valves (e.g., an "EXV" such as EXV1, by generating a suitable control signal) to cause the refrigerant to expand to lower pressure, from approximately the compressor outlet pressure $P_b$ to approximately the compressor inlet pressure Pa (e.g., with deviations based on flow losses). To illustrate, EXV1 may include any suitable control valve such as, for example, any of control valves 450-453 and 438 of FIG. 4, or a combination thereof, that is controlled to partially open to cause expansion of the refrigerant.

As illustrated in panel 510, the compressor causes the refrigerant to flow in the indicated loop, including a path through compressor 402 (e.g., from point "a0" to point "b0"), through an EXV (e.g., from point "b0" to point "c0"), and then to accumulator 404 (e.g., from point "c0" back to point "a0" or nearly point "a0"). As compressor 402 compresses the refrigerant, the work input to compressor 402 (e.g., Win, in the form of electrical work to the compressor motor) is substantially converted to thermal energy of the refrigerant because there is little to no heat transfer to any other system. To illustrate, the heat boost process (i.e., refrigerant warming) starts by the system compressing low-temperature, low-pressure refrigerant at state "a0" (e.g., vapor or predominantly vapor) into high-temperature, high-pressure refrigerant at state "b0" (e.g., vapor). Refrigerant at state "b0" is expanded by a first EXV (EXV1, as illustrated) to "medium-temperature" (e.g., warmer than state "a" but cooler than state "b"), "low-pressure" refrigerant at state "c0" (e.g., vapor), and then enters back into a compressor suction port of compressor 402 via accumulator 404.

Panel 520 illustrates the warm-up process wherein the refrigerant warms (e.g., from compressor work). The refrigerant flows in the indicated loop, including a path through compressor 402 (e.g., from point "a" to point "b"), through an EXV (e.g., from point "b" to point "c"), and then to accumulator 404 (e.g., from point "c" back to point "a" or nearly point "a"). Points "a," "b," and "c" may change temporally as the refrigerant warms (e.g., indicated by the "warming" arrow in panel 520). The p-H loop illustrated in panel 520 may continue to be moved up the p-H curve as the refrigerant warms, causing point "b" to reach greater compressor outlet pressures ($P_b$) and enthalpies ($H_b$) as the refrigerant recirculates. As the cycle illustrated in panel 520 repeats by compressor 402 compressing now-warmer refrigerant (e.g., from state "a" to state "c"), the suction temperature rises (e.g., the inlet of compressor 402) and the suction pressure rises (e.g., the inlet of compressor 402). Accordingly, the refrigerant achieves greater density and mass flow rate, and the compressor performs greater compressor work (e.g., this process is referred to herein as "heat boost" or "warm-up").

Step 506 includes the system determining whether to continue the heat boost or proceed to a heating process. In some embodiments, the system determines whether to continue heat boost based on a property of the refrigerant. For example, the system may base the determination of step 506 on compressor outlet pressure, outlet pressure, inlet pressure, inlet temperature (e.g., temperature of the refrigerant in accumulator 404 or at a suction port), density, internal energy, enthalpy, any other suitable property, any suitable changes thereof, or any combination thereof. In some embodiments, control circuitry 310 monitors sensor signals from one or more sensors of sensors 304, which may include temperature sensors, pressure sensors, flow sensors, any other suitable sensors, or any combination thereof. When the sensor signal, or operating characteristic derived therefrom (e.g., based on a calibration, calculation, or both), meets one or more criteria, then control circuitry 310 may determine to proceed to a heating process. In an illustrative example, when the measured compressor outlet pressure exceeds a predetermined threshold, control circuitry 310 may set a flag to change configurations from warming to heating. If the sensor signal, or operating characteristic derived therefrom, does not meet the criteria, then control circuitry 310 may remain in the warming configuration (e.g., by repeating or otherwise continuing step 504).

Step 508 includes the system performing a heating process. During the heating process, the system achieves a second configuration to circulate refrigerant for heating one or more other systems. For example, at step 508, control circuitry 310 may generate a control signal to control speed, pressure increase, or other suitable operating characteristic of compressor 402 to compress the refrigerant. At step 508, the system causes heat transfer to the one or more systems, such as a cabin air system (e.g., controlling a duct door and/or air blower fan to convect heat away from the refrigerant) or battery system (e.g., controlling a control valve or coolant pump to convect heat away from the refrigerant) to allow the refrigerant to transfer heat. Heat transfer occurs, for example, via one or more suitable heat exchangers such as heat exchanger 424, 430, 442, 454, or a combination thereof.

In some embodiments, as illustrated by panel 530, once the suction pressure (or other suitable property) exceeds a threshold, a first portion of high-temperature, high-pressure refrigerant at state "b" is directed to EXV1 and is expanded to medium-temperature, low-pressure refrigerant at state "c" (e.g., vapor). A second portion of refrigerant at state "b" is directed to one or more heat exchangers (HEX 1, HEX i, and HEX N, for N total heat exchangers) for heating purposes, where it is cooled into medium-temperature, high-pressure refrigerant at state "d". The one or more heat exchangers may include a refrigerant-to-air heat exchanger for cabin heating, a refrigerant-to-coolant heat exchanger for ESS heating, or both refrigerant-to-air heat exchanger and refrigerant-to-coolant heat exchanger in parallel for simultaneous cabin and ESS heating, for example. Refrigerant at state "d" is routed to EXV I, and expanded to "low-temperature, low-pressure" refrigerant at state "e" (e.g., a liquid-vapor mixture). The "medium-temperature" refrigerant at state "c" mixes with the "low-temperature" refrigerant at state "e" (e.g., in accumulator 404) and heats the latter to become refrigerant at state "a" after passing accumulator. To illustrate, mixing includes near-zero net heat transfer, with the amount of heat absorption by refrigerant at state "e" equaling the amount of heat rejection by refrigerant at state "c". To illustrate, the cycle illustrated in panel 530 by states a-b-d-e-a and states a-b-c-a results in compressor work being equal to heat rejection via the one or more heat exchangers.

Figure 6:
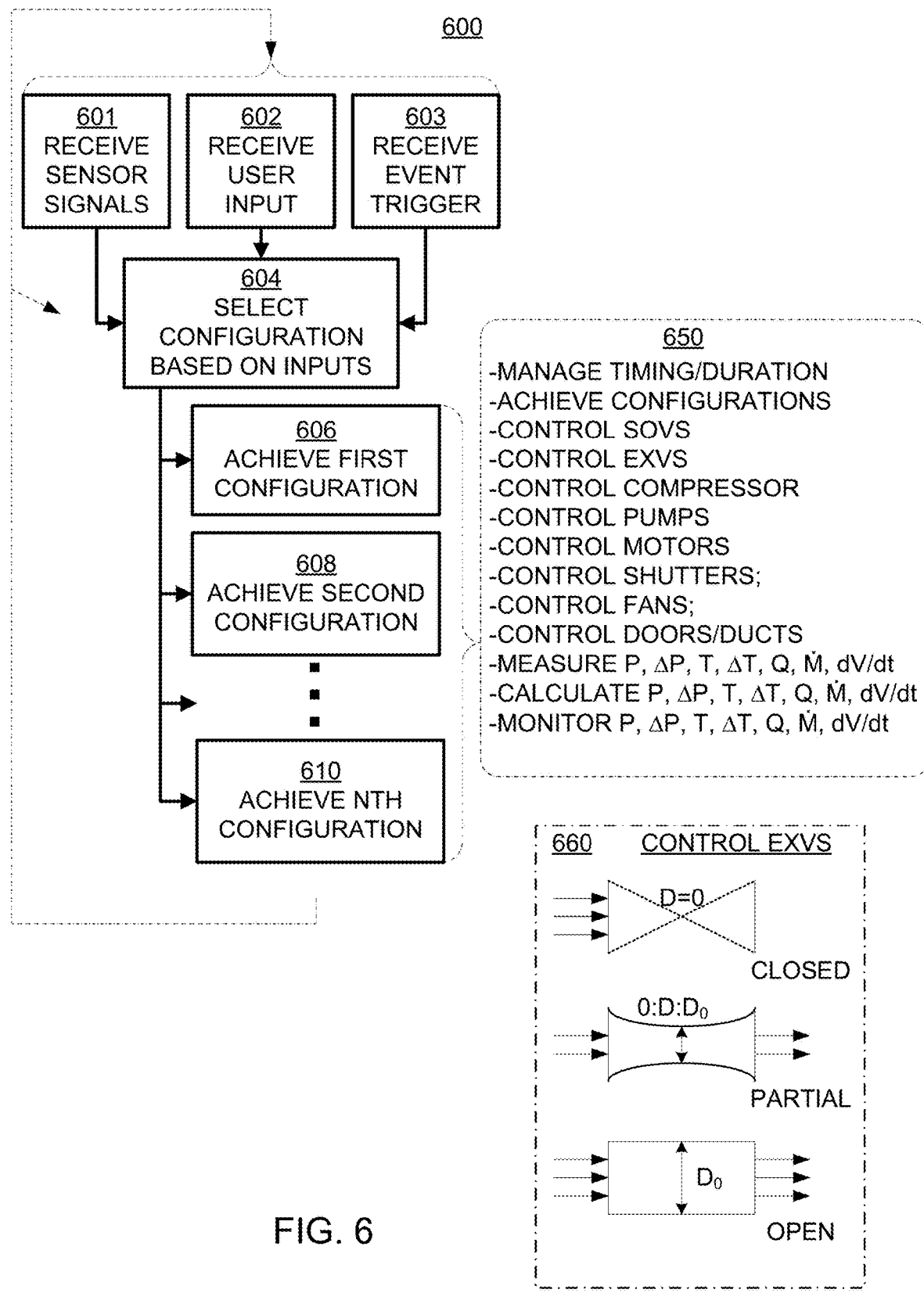
FIG. 6 is a flowchart of an illustrative process for managing heating using a heat pump system, in accordance with some embodiments of the present disclosure.

FIG. 6 is a flowchart of illustrative process 600 for managing heating using a heat pump system in accordance with some embodiments of the present disclosure. For example, process 600 may be implemented for vehicle 100, using control system 120 or control circuitry 310 of system 300. In a further example, process 600 may be implemented to control refrigerant system 210 of FIG. 2, refrigerant system 320 of system 300, or system 400 of FIG. 4. Panels 650 and 660 illustrate some aspects of process 600 in the context of the heat pump system including, for example, control circuitry 310, compressor 402, control valves 438 and 450-453, door 492, pump 462, SOVs 440 and 446, any other suitable components (e.g., blower fans, duct doors, other valves, sensors), or any combination thereof. In an illustrative example, process 600 may correspond to some or all of process 500 of FIG. 5.

Step 601 includes the system receiving one or more sensor signals. In some embodiments, control circuitry 310 receives one or more sensor signals from sensors 304, which may include temperature sensors, pressure sensors, flow meters, flow controllers, speed sensors (e.g., a rotary encoder for a rotating shaft), position sensors (e.g., valve position sensors), any other suitable sensors, and differential sensors thereof (e.g., to measure a pressure differential, temperature differential, or other difference or gradient), or any combination thereof. In some embodiments, the system may sample an analog signal and store time-indexed values in memory 319. In some embodiments, the system may receive a digital signal from a smart sensor (e.g., using serial communication for TCP/IP, modbus, CANbus, RS-485, or any other suitable physical, transport, network, or data link layer protocol). The system may sample a signal at any suitable sampling frequency, in response to an event or trigger, or a combination thereof.

Step 602 includes the system receiving one or more user inputs (e.g., at user interface 306 or any other suitable interface). In some embodiments, control circuitry 310 may receive an indication from user interface 306, which may include a knob, dial, slider, hard button, soft button, selection from a touchscreen, input from a keypad or touchscreen, any other suitable input, or any combination thereof. For example, the system may receive a user input of target cabin temperature (e.g., that includes heating in cold weather). In a further example, the system may receive a cabin setting from a cabin system based on user selections or preferences. To illustrate, the user input may be received before the vehicle is in operation, or during operation (e.g., while the vehicle is being driven or otherwise moving).

Step 603 includes the system receiving one or more event triggers. In some embodiments, the system may receive an event trigger or other indication from another system or control circuitry thereof. For example, in some embodiments, control circuitry 310 may receive an indication of a target refrigerant temperature, target heat transfer, target coolant temperature, target air temperature, target heat exchanger temperature, any other suitable target value, or any combination thereof for requesting or indicating heat transfer to another system via a heat exchanger. The event trigger may include a message, a flag or variable value, a state of a software state machine, a setpoint, any other suitable indicator, or any combination thereof. The system may receive the event trigger via a communications interface (e.g., comm 318), using any suitable communications protocol.

Step 604 includes the system selecting a configuration from among a plurality of configurations based on any or all of the inputs of steps 601-603. In some embodiments, memory 319 may store instructions for control circuitry 310 to select a configuration. The system may perform step 604 based on a sensor signal or value derived thereof, user information, an event trigger, reference information (e.g., a threshold, operating range, limit, or change thereof), a time duration, state designation of another system or the heat pump system, any other suitable criteria, or any combination thereof. In some embodiments, the system may compare a refrigerant property such as compressor inlet or outlet pressure or temperature to a suitable threshold or range. In some embodiments, the system may retrieve, access, or otherwise use a database or other suitable reference information to determine which configuration to select. In some embodiments, the available selections (e.g., available configurations) depend on the operating state of the vehicle. For example, the configurations may include warm-up/heat-boost, heat system, cool system, or any other suitable configuration of control valve settings, compressor speed, shut-off valve settings, pump settings, duct door settings, blower fan settings, any other suitable settings or operating characteristics, or any combination thereof.

In some embodiments, the system may select from among any suitable number of configurations. As an illustrative example, three configurations corresponding to steps 606, 608, and 610 are illustrated in FIG. 6. Process 600 may be implemented for only two configurations, or more than two configurations (e.g., a plurality of configurations), for example. Achieving the configurations of steps 606-610 may include, as illustrated in panel 650 for example, managing a time or duration of operation, controlling one or more SOVs, controlling one or more EXVs, controlling one or more compressors, controlling one or more pumps (e.g., for coolant), controlling one or more motors (e.g., coupled to pumps, compressors, or fans), controlling one or more shutters for directing airflow, controlling one or more blower fans for blowing cabin air, controlling one or more ducts and/or doors for directing airflow, measuring pressure or change thereof, measuring temperature or changes thereof, measuring volumetric or mass flow rate, measuring heat transfer (e.g., based on a temperature difference or gradient), any other suitable actions, or any combinations thereof. In a further example, panel 660 illustrates control settings for EXVs such as control valves 438 and 450-453 of FIG. 4, for example. The effective open area (e.g., a minimum or effective minimum area available for fluid flow) may be adjustable between an effective diameter (or corresponding area) of zero (e.g., at a fully closed position) to a maximum diameter (or corresponding area A0) of DO that is greater than zero (e.g., at a fully open position). The effective opening diameter D may be controlled to be between zero and DO to provide a controllable expansion or throttling effect (e.g., arising from pressure drop across the valve) on the refrigerant.

Step 606 includes the system achieving a first configuration. In some embodiments, the first configuration corresponds to a warm-up configuration, as achieved during step 504 of process 500. At step 606, the system achieves the first configuration to recirculate refrigerant without substantially warming any other system. For example, at step 606, control circuitry 310 may generate a control signal to control speed, pressure increase, or other suitable operating characteristic of compressor 402 to begin to compress the refrigerant. At step 606, the system prevents appreciable heat transfer to any other system such as a cabin air system (e.g., controlling a duct door and/or air blower fan to not convect heat away from the refrigerant) or battery system (e.g., controlling a control valve or coolant pump to not convect heat away from the refrigerant) to allow the refrigerant to warm and reach a desired operating condition.

Step 608 includes the system achieving a second configuration. To illustrate, step 608 may be the same as or otherwise similar to step 508 of process 500. The second configuration may correspond to the system performing a heating process, in which the system achieves the second configuration to circulate refrigerant for heating one or more other systems. For example, at step 608, control circuitry 310 may generate a control signal to control speed, pressure increase, or other suitable operating characteristic of compressor 402 to compress the refrigerant. At step 608, the system causes heat transfer to the one or more systems, such as a cabin air system (e.g., controlling a duct door and/or air blower fan to convect heat away from the refrigerant) or battery system (e.g., controlling a control valve or coolant pump to convect heat away from the refrigerant) to allow the refrigerant to transfer heat.

Step 610 includes the system achieving an Nth (e.g., a third) configuration. To illustrate, step 610 may include the system performing a heating process, cooling process, or combination thereof, using circulated refrigerant. For example, at step 610, control circuitry 310 may generate a control signal to control speed, pressure increase, or other suitable operating characteristic of compressor 402 to compress the refrigerant. At step 610, the system may operate as a heat pump, refrigeration cycle, or combination thereof to transfer heat with the one or more systems, such as a cabin air system (e.g., controlling a duct door and/or air blower fan to convect heat away from the refrigerant) or battery system (e.g., controlling a control valve or coolant pump to convect heat away from the refrigerant). For example, step 610 may include normal operation (e.g., once the refrigerant has been warmed at step 606), wherein a user may provide an indication for cooling, heating, or a combination thereof over time.

In an illustrative example, a system may include a compressor (e.g., compressor 402) configured to compress a refrigerant, a plurality of control valves (e.g., control valves 438 and 450-453) that may operate as EXVs and control a flow of the refrigerant, and control circuitry (e.g., control circuitry 310) coupled to the plurality of control valves. The control circuitry may be configured to achieve a first configuration (e.g., step 504 or step 606) and a second configuration (e.g., step 508 or any of steps 608-610) of the plurality of control valves. In the first configuration (e.g., see FIGS. 7-8), the refrigerant is recirculated by the compressor to increase a compressor outlet pressure, while not transferring appreciable heat to any other subsystem or fluid (e.g., no significant transfer to or from air or coolant other than conduction/convective losses). When the compressor outlet pressure (e.g., $P_b$) reaches a predetermined threshold (e.g., as determined at step 506 or step 604), the control circuitry causes the system (e.g., system 400) to achieve the second configuration (e.g., see FIGS. 9-11), in which the refrigerant is circulated to transfer heat to one or more thermal loads (e.g., via heat exchanger 430, heat exchanger 454, or both).

In an illustrative example of step 504, during the warm-up process (e.g., see FIG. 7), the refrigerant flows along a path (e.g., path 750) that includes the compressor (e.g., compressor 402), two cabin heat exchangers (e.g., heat exchangers 424 and 430) configured to not heat cabin air (e.g., door 492 is closed and/or blower is OFF), and an accumulator (e.g., accumulator 404). For example, the warm-up process and path 750 may also correspond to step 606 of process 600 (e.g., system 400 achieves the first configuration to implement the warm-up process).

In a further illustrative example of step 504, during the warm-up process (e.g., see FIG. 8), the refrigerant flows along a path (e.g., path 850) that includes the compressor (e.g., compressor 402), a cabin heat exchanger (e.g., heat exchanger 424) configured to not heat cabin air (e.g., door 492 is closed), a battery system heat exchanger (e.g., heat exchanger 454), and an accumulator (e.g., accumulator 404). For example, the warm-up process and path 850 may also correspond to step 606 of process 600 (e.g., system 400 achieves the first configuration to implement the warm-up process).

In a further illustrative example of step 504 (or step 606), during the warm-up process (e.g., see FIGS. 7-8), the refrigerant flows along a path (e.g., path 750 or 850) that includes a first control valve of the plurality of control valves that is fully open (e.g., control valve 451 or control valve 453), and a second control valve of the plurality of control valves that is partially open (e.g., control valve 450 or control valve 452) to generate a pressure drop in the refrigerant (e.g., operates as an expansion valve).

In an illustrative example of step 508 (or step 608), during a heating process (e.g., see FIG. 9), the refrigerant flows along a path (e.g., path 950) that includes a first cabin heat exchanger (e.g., heat exchanger 424) configured to optionally heat cabin, a first subpath (e.g., subpath 952) through a second cabin heat exchanger (e.g., heat exchanger 430) that transfers heat from the refrigerant to cabin air, and a second subpath (e.g., subpath 951) parallel to the first subpath through a battery system heat exchanger (e.g., heat exchanger 454). For example, the refrigerant may heat the cabin air and not the battery system coolant.

In an illustrative example of step 508 (or step 608), the system may achieve a second configuration (e.g., see FIG. 10) in which the refrigerant flows along a path including a first cabin heat exchanger (e.g., heat exchanger 424), a first subpath through a second cabin heat exchanger (e.g., heat exchanger 430), a second subpath parallel to the first subpath through a battery system heat exchanger (e.g., heat exchanger 454) that transfers heat from the refrigerant to a battery system (e.g., ESS 458, via coolant pumped by pump 462) of the vehicle. For example, the refrigerant may heat the battery system coolant and not the cabin air (e.g., no appreciable heat transfer via heat exchanger 430).

In an illustrative example of step 508 (or step 608), the system may achieve a second configuration (e.g., see FIG. 11) in which the refrigerant flows along a path including a first cabin heat exchanger (e.g., heat exchanger 424), a first subpath through a second cabin heat exchanger (e.g., heat exchanger 430) that transfers a first amount of heat from the refrigerant to cabin air (e.g., based on a blower fan and/or duct doors), and a second subpath parallel to the first subpath through a battery system heat exchanger (e.g., heat exchanger 454) that transfers a second amount of heat from the refrigerant to a battery system (e.g., ESS 458, via coolant pumped by pump 462) of the vehicle. For example, the refrigerant may provide heat to both the cabin air and the battery system coolant.

In an illustrative example of step 508 (or step 608), the system may achieve the second configuration in which the refrigerant flows along a first subpath though two control valves of the plurality of control valves arranged on either side of a first heat exchanger (control valves 450 and 451, and heat exchanger 430). The refrigerant also may flow along a second subpath parallel to the first subpath through another two control valves of the plurality of control valves arranged on either side of a second heat exchanger (e.g., control valves 452 and 453, and heat exchanger 454).

In an illustrative example of step 508 (or step 608), the system may achieve the second configuration in which the refrigerant flows along a path including a first control valve and a second control valve of the plurality of control valves that are fully open, and a third control valve and a fourth control valve of the plurality of control valves that are partially open to generate a pressure drop in the refrigerant. For example, one of control valves 450 and 451 is open and the other is partially open (e.g., for expansion of the refrigerant along a first subpath), and additionally one of control valves 452 and 453 is open and the other is partially open (e.g., for expansion of the refrigerant along a second subpath).

Figure 7:
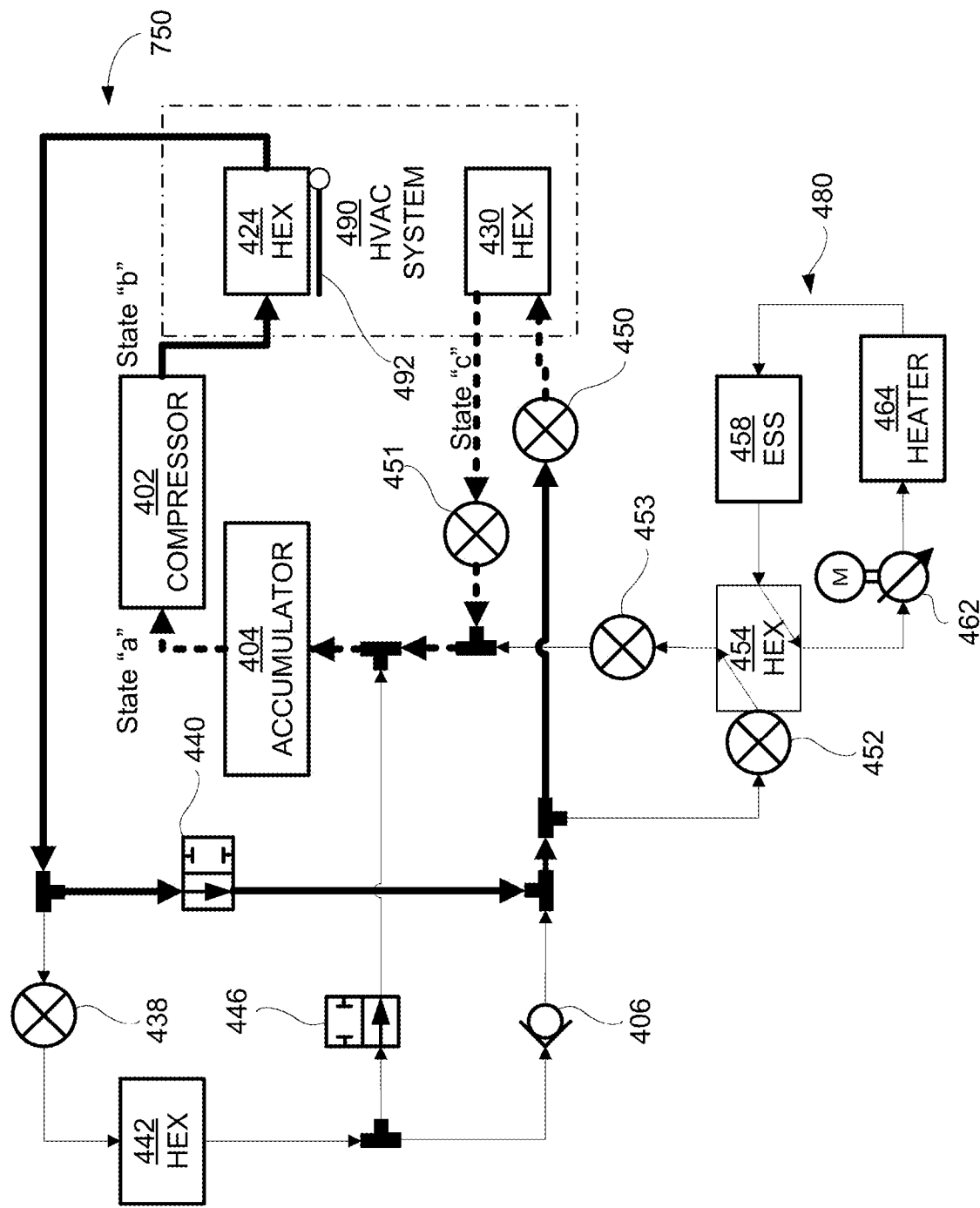
FIG. 7 is a block diagram of the system of FIG. 4, in a warm-up configuration, in accordance with some embodiments of the present disclosure.
Figure 8:
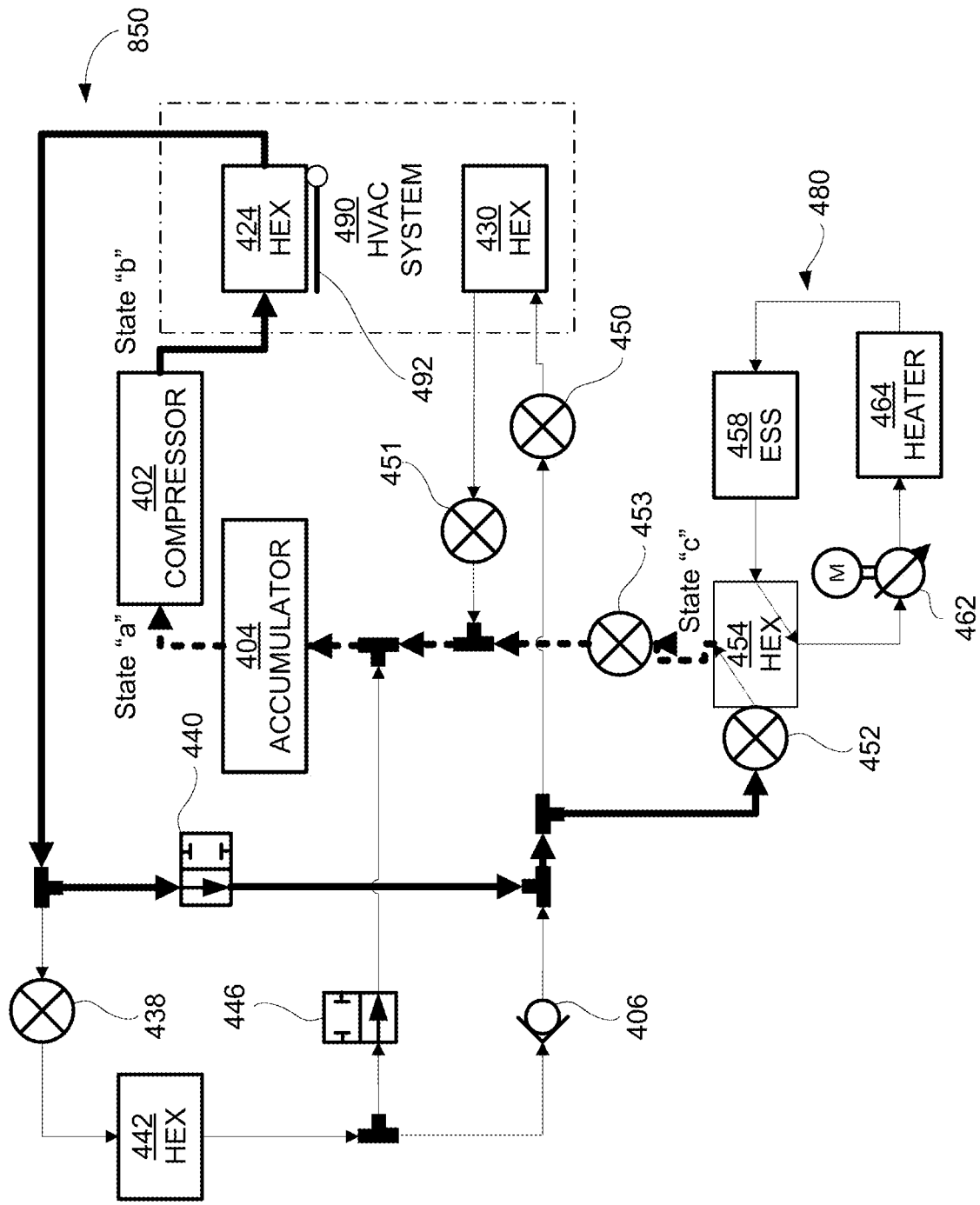
FIG. 8 is a block diagram of the system of FIG. 4, in another warm-up configuration, in accordance with some embodiments of the present disclosure.
Figure 9:
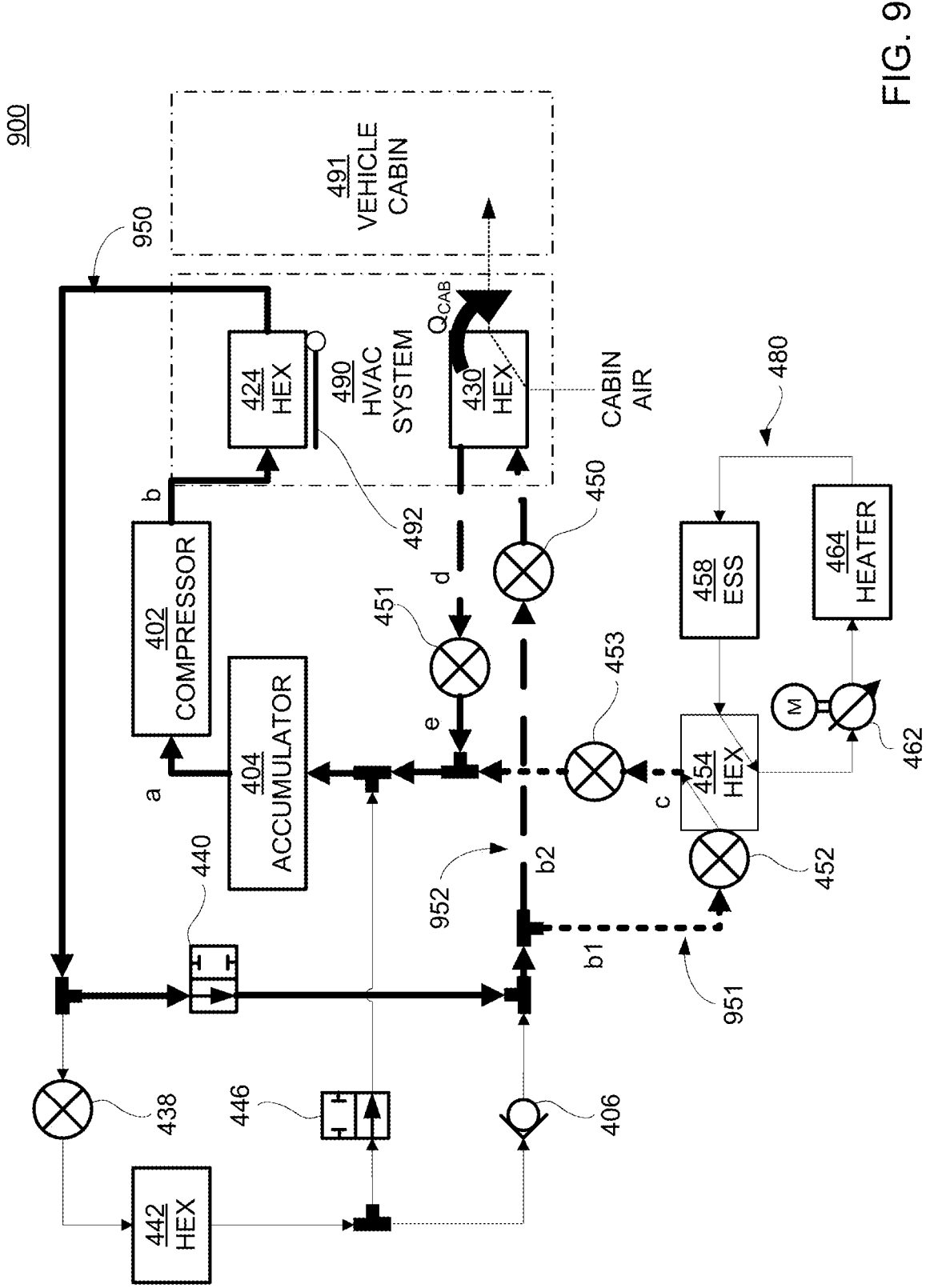
FIG. 9 is a block diagram of the system of FIG. 4, in a cabin-heating configuration, in accordance with some embodiments of the present disclosure.
Figure 10:
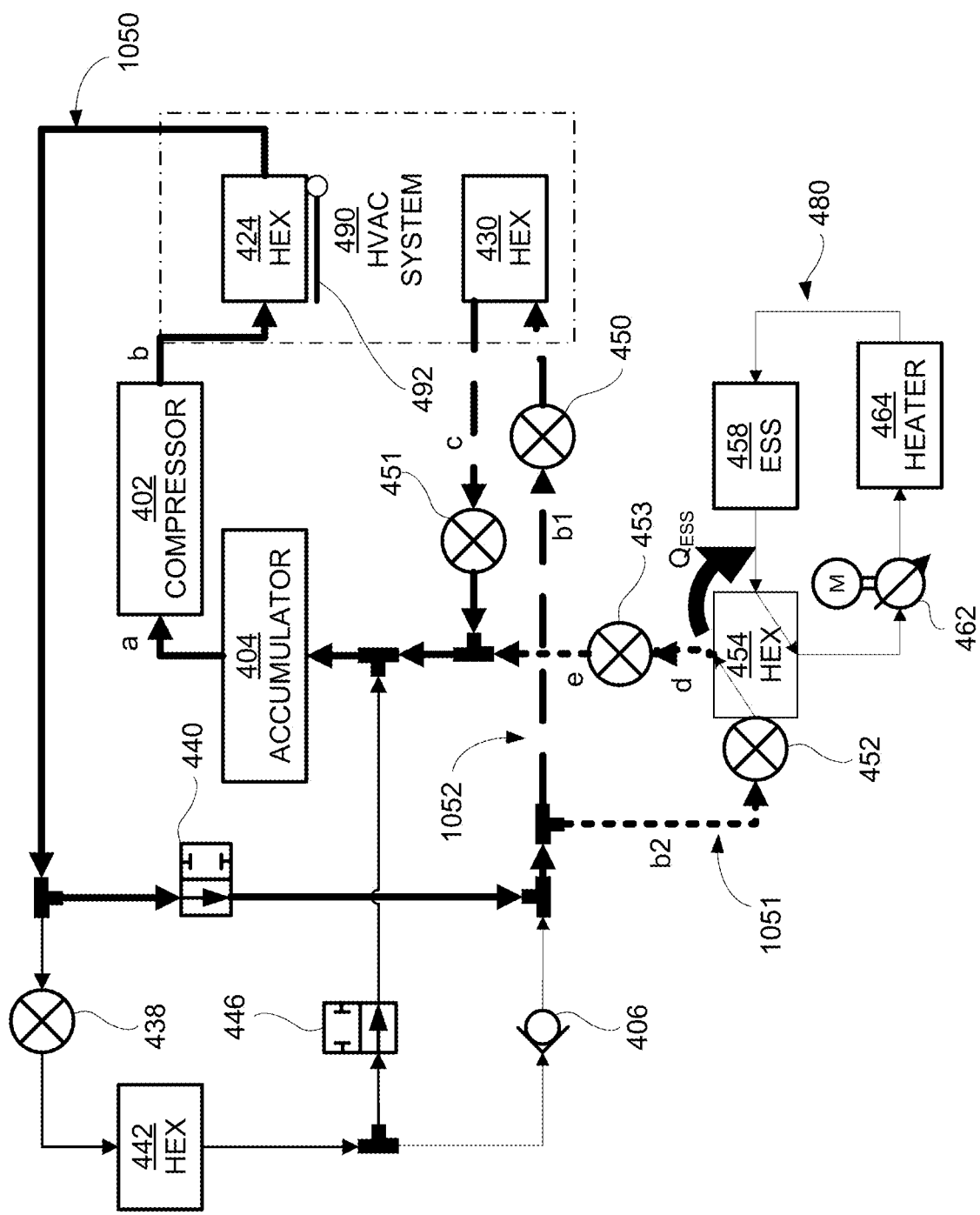
FIG. 10 is a block diagram of the system of FIG. 4, in a battery-heating configuration, in accordance with some embodiments of the present disclosure.
Figure 11:
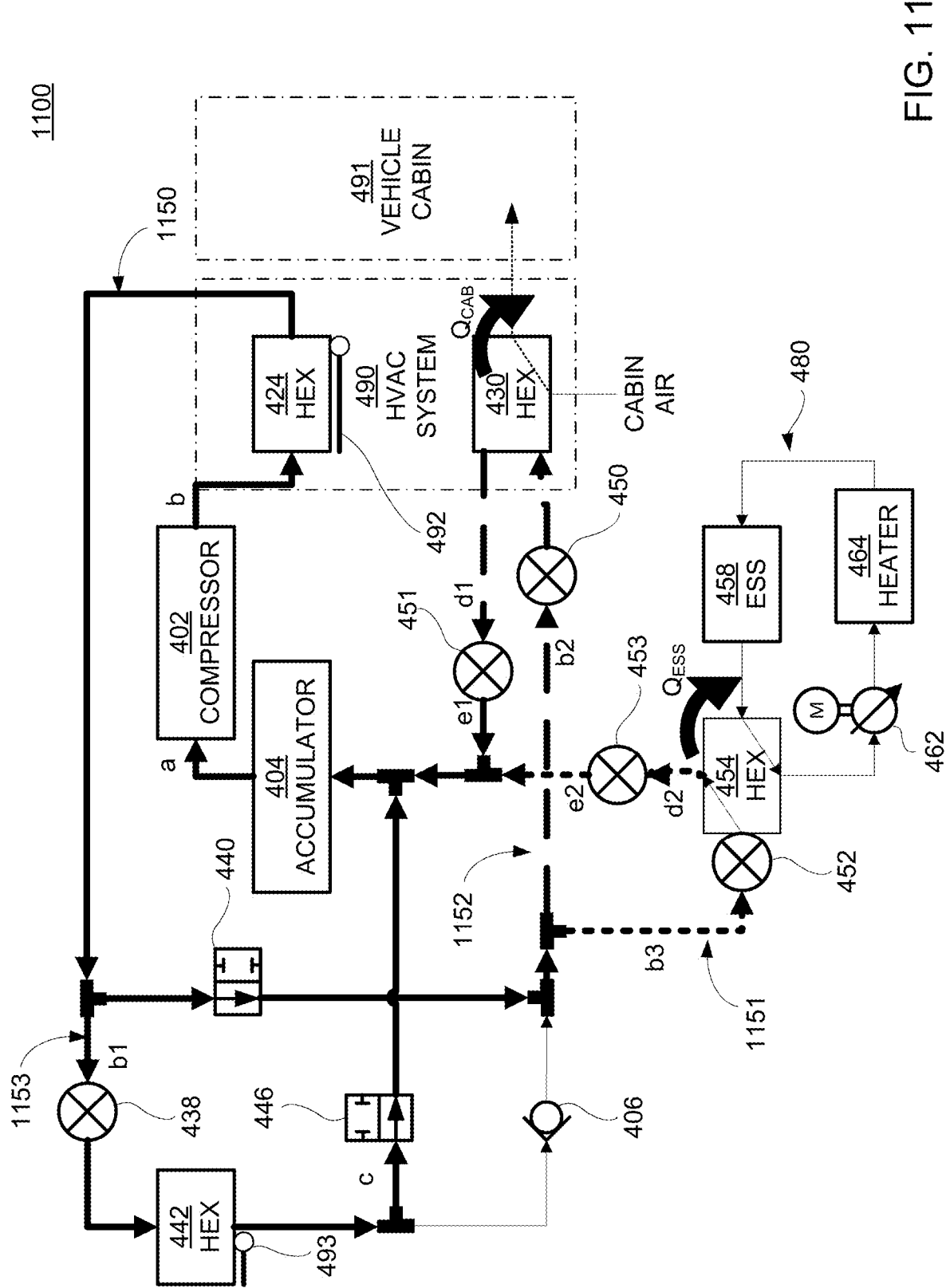
FIG. 11 is a block diagram of the system of FIG. 4, in a cabin-heating and battery-heating configuration, in accordance with some embodiments of the present disclosure.

As illustrated in FIGS. 7-11, system 400 of FIG. 4 may be controlled to implement compressor heat boost, by achieving a warm-up configuration and then a heating configuration. FIGS. 7-8 illustrate warm-up configurations, while FIGS. 9-11 illustrate heating configurations. Accordingly, configurations 700-1100 illustrated in FIGS. 7-11 may be achieved by implementing some or all of processes 500 or 600 of FIGS. 5-6. States "a," "b," and "c" of FIG. 5 are also referenced in the discussion of FIGS. 7-11.

FIG. 7 is a block diagram of system 400 of FIG. 4, in warm-up configuration 700, in accordance with some embodiments of the present disclosure. In FIG. 7, heavy lines indicate conduits through which flow is allowed (e.g., flow is completely or almost completely cut-off to conduits corresponding to non-heavy lines). Further, in FIG. 7, solid, heavy lines indicate refrigerant at state "b" while dotted, heavy lines indicate refrigerant at state "a" or "c" as illustrated in FIG. 6. In configuration 700, control valve 450 is controlled to partially open (e.g., as a throttle valve for refrigerant expansion), and control valves 438, 452, and 453 are fully closed to prevent refrigerant flow. To illustrate, control valve 450 expands refrigerant from state "b" to state "c" as illustrated in FIG. 6. Control valve 451 is controlled to fully open (e.g., maximum open area or effective diameter Do) to allow the flow of refrigerant at state "c" to enter compressor 402 via accumulator 404 with minimal pressure loss. As the cycle repeats by compressor 402 compressing now-warmer refrigerant (e.g., from state "a" to state "c"), the suction temperature rises (e.g., the inlet of compressor 402) and the suction pressure rises (e.g., the inlet of compressor 402). Accordingly, the refrigerant achieves greater density and mass flow rate, and the compressor performs greater compressor work (e.g., this process is referred to herein as "heat boost" or "warm-up"). Path 750 corresponds to a flow path of the refrigerant, as governed by control valves 438 and 450-453, and shut-off valves 440 and 446. Path 750 includes compressor 402, heat exchanger 424, SOV 440, control valve 450, heat exchanger 430, control valve 451, accumulator 404, and any suitable fittings and conduits.

FIG. 8 is a block diagram of system 400 of FIG. 4, in warm-up configuration 800, in accordance with some embodiments of the present disclosure. Similar to FIG. 7, in FIG. 8, heavy lines indicate conduits through which flow is allowed (e.g., flow is completely or almost completely cut-off to conduits corresponding to non-heavy lines). Further, in FIG. 8, solid, heavy lines indicate refrigerant at state "b" while dotted, heavy lines indicate refrigerant at state "a" or "c" as illustrated in FIG. 6. In configuration 800, control valve 452 is controlled to partially open (e.g., as a throttle valve for refrigerant expansion), and control valves 438, 450, and 451 are fully closed to prevent refrigerant flow. To illustrate, control valve 452 expands refrigerant from state "b" to state "c" as illustrated in FIG. 5. Control valve 453 is controlled to fully open (e.g., maximum open area or effective diameter Do) to allow the flow of refrigerant at state "c" to enter compressor 402 via accumulator 404 with minimal pressure loss. Path 850 corresponds to a flow path of the refrigerant, as governed by control valves 438 and 450-453, and shut-off valves 440 and 446. Path 850 includes compressor 402, heat exchanger 424, SOV 440, control valve 452, heat exchanger 454, control valve 453, accumulator 404, and any suitable fittings and conduits.

In an illustrative example, control circuitry 310 may perform step 504 of process 500, achieving either of configurations 700 or 800 to increase refrigerant pressure. Table 1 illustrates control valve settings during step 504, for example.

TABLE 1

Illustrative control valve settings during step 504 (or step 606).

|  | Control valve 438 | Control valve 450 | Control valve 451 | Control valve 452 | Control valve 453 |
| --- | --- | --- | --- | --- | --- |
| Configuration 700 | Closed | Expansion | Open | Closed | Closed |
| Configuration 800 | Closed | Closed | Closed | Expansion | Open |

FIG. 9 is a block diagram of system 400 of FIG. 4, in cabin-heating configuration 900, in accordance with some embodiments of the present disclosure. Configuration 900 may correspond to the second configuration of step 508 or step 608, for example. In configuration 900, control valve 438 is fully closed to prevent refrigerant flow, control valves 450 and 453 are fully open, and control valves 452 and 451 are partially open (e.g., as a throttle valve for refrigerant expansion). To illustrate, control valve 452 expands a first portion ('b1') of refrigerant at state "b" to state "c" while control valve 451 expands a second portion ('b2') of refrigerant at state "d" to state "e". Control valve 453 is controlled to fully open to allow flow (e.g., first portion b1) of refrigerant at state "c" to incur minimal or otherwise lesser pressure loss (e.g., than control valve 452). Control valve 450 is controlled to fully open to allow flow of the second portion ('b2') of refrigerant at state "b" into heat exchanger 430 (e.g., refrigerant-to-air) with minimal or otherwise lesser pressure loss (e.g., than control valve 451) for cabin heating. The first (b1) and second (b2) portions of refrigerant at states "c" and "e" merge and flow into accumulator 404 to become refrigerant at state "a" and then back to the suction side of compressor 402. Path 950 (e.g., the solid black line) splits into subpaths 951 (e.g., short-dashed lines) and 952 (e.g., long-dashed lines), to flow through respective heat exchangers 454 and 430 to exchange heat with either or both respective systems.

During a heating process in configuration 900 (e.g., performed after steps 504 or 606, as illustrated in FIG. 7 or 8), a first portion "b1" (e.g., corresponding to a first subpath) of "high-temperature, high-pressure" refrigerant at state "b" goes to a first EXV (e.g., control valve 452) and is expanded to "medium-temperature, low-pressure" refrigerant at state "c". A second portion "b2" (e.g., corresponding to a second subpath) of refrigerant at state "b" flows into a refrigerant-to-air heat exchanger (e.g., heat exchanger 430) to transfer heat to a HVAC inlet airflow (e.g., cabin air) which is then supplied to the cabin (e.g., cabin air system 370). The refrigerant portion "b2" is cooled into "medium-temperature, high-pressure" refrigerant at state "d" and expanded by an EXV (e.g., control valve 451) to "low-temperature, low-pressure" refrigerant at state "e". Refrigerant at state "c" and refrigerant at state "e" merge and flow into an accumulator (e.g., accumulator 404) to become refrigerant at state "a", which then flows back to an inlet of a compressor (e.g., a suction port of compressor 402). In some embodiments, the illustrative cycle of configuration 900 results in compressor work equal to cabin heating capacity (e.g., refrigerant-to-air heat rejection via heat exchanger 430).

FIG. 10 is a block diagram of system 400 of FIG. 4, in battery-heating configuration 1000, in accordance with some embodiments of the present disclosure. Configuration 1000 may correspond to the second configuration of step 508 or step 608, for example. In configuration 1000, control valve 438 is closed to prevent refrigerant flow, control valve 450 functions as a first EXV to expand a first portion ('b1') of refrigerant at state "b" into refrigerant at state "c", control valve 451 is fully open to allow flow of refrigerant at state "c" with minimal pressure loss, control valve 452 is fully open to allow flow of a second portion ('b2') of refrigerant at state "b" into (refrigerant-to-coolant) heat exchanger 454 with minimal pressure loss for heating of ESS 458 via coolant pumped by pump 462. Control valve 453 functions as a second EXV to expand the second portion ('b2') of refrigerant at state "b" into refrigerant at state "e". Refrigerant at state "c" and refrigerant at state "e" (e.g., of portions b1 and b2) merge and flow into accumulator 404 to become refrigerant at state "a" and then flow back to an inlet of the compressor (e.g., a suction port of compressor 402). Path 1050 (e.g., the solid black line) splits into subpaths 1051 (e.g., short-dashed lines) and 1052 (e.g., long-dashed lines), to flow through respective heat exchangers 454 and 430 to exchange heat with either or both respective systems.

During a heating process in configuration 1000 (e.g., performed after steps 504 or 606, as illustrated in FIG. 7 or 8), a first portion ('b1') of "high-temperature, high-pressure" refrigerant at state "b" flow through control valve 450 and is expanded to "medium-temperature, low-pressure" refrigerant at state "c". A second portion ('b2') of refrigerant at state "b" flows into (refrigerant-to-coolant) heat exchanger 454 to heat the coolant flow in battery system 480 (e.g., driven by coolant pump 462), which then heats battery cells of ESS 458. The refrigerant portion "b2" is cooled into "medium-temperature, high-pressure" refrigerant at state "d" and is expanded by control valve 453 to "low-temperature, low-pressure" refrigerant at state "e". In some embodiments, the illustrative cycle of configuration 1000 results in compressor work equal to ESS heating capacity (e.g., refrigerant-to-coolant heat rejection via heat exchanger 454). For example, depending on the required ESS heating capacity, a high-voltage heater (e.g., heater 464) may thus either be reduced in size or completely eliminated for cost and mass benefits.

FIG. 11 is a block diagram of the system of FIG. 4, in cabin-heating and battery-heating configuration 1100, in accordance with some embodiments of the present disclosure. Configuration 1100 may correspond to the second configuration of step 508 or step 608, for example. In configuration 1100, control valve 438 functions as a first EXV to expand a first portion ('b1') of refrigerant at state "b" into refrigerant at state "c", and control valve 450 is fully open to allow flow of a second portion ('b2') of refrigerant at state "b" into (refrigerant-to-air) heat exchanger 430 with minimal pressure loss for cabin heating. Control valve 451 functions as a second EXV to expand the second portion ('b2') of refrigerant at state "d1" into refrigerant at state "e1", and control valve 452 is fully open to allow flow of a third portion ('b3') of refrigerant at state "b" into (refrigerant-to-coolant) heat exchanger 454 with minimal pressure loss for heating of ESS 458 via coolant pumped by pump 462. Control valve 453 functions as a third EXV to expand the third portion ('b3') of refrigerant at state "d2" into refrigerant at state "e2". Refrigerant at state "c" (e.g., portion b1), refrigerant at state "e1" (e.g., portion b2), and refrigerant at state "e2" (e.g., portion b3) merge and flow into accumulator 404 to become refrigerant at state "a" and then flow back to an inlet of the compressor (e.g., a suction port of compressor 402). Path 1150 (e.g., the solid black line) splits into subpaths 1151 (e.g., short-dashed lines) and 1152 (e.g., long-dashed lines), to flow through respective heat exchangers 454 and 430 to exchange heat with both respective systems, as well as subpath 1153, to flow through an outside heat exchanger (e.g., heat exchanger 442). In some embodiments, to minimize heat loss from heat exchanger 442 to ambient, an active grille shutter (AGS 493) is included and controlled to a closed position (e.g., to block air convection through heat exchanger 442).

During a heating process in configuration 1100 (e.g., performed after steps 504 or 606, as illustrated in FIG. 7 or 8), a first portion ('b1') of "high-temperature, high-pressure" refrigerant at state "b" goes to a first EXV (e.g., control valve 438) and is expanded to "medium-temperature, low-pressure" refrigerant at state "c". A second portion ('b2') of refrigerant at state "b" flows into "refrigerant-to-air" heat exchanger 430 to heat a HVAC inlet airflow (e.g., cabin air) which is then supplied to the cabin of the vehicle. The refrigerant portion 'b2' is cooled into "medium-temperature, high-pressure" refrigerant at state "d1" and is expanded by control valve 451 to low-temperature, low-pressure refrigerant at state "e1". A third portion ('b3') of refrigerant at state "b" flows into "refrigerant-to-coolant" heat exchanger 454 to heat the coolant flow in battery system 480 (e.g., driven by coolant pump 462), which then heats battery cells of ESS 458. The refrigerant portion "b3" is cooled into "medium-temperature, high-pressure" refrigerant at state (d2) and expanded by control valve 453 to "low-temperature, low-pressure" refrigerant at state "e2". In some embodiments, the flow of refrigerant at state "c" is through an outside heat exchanger (e.g., heat exchanger 442). Accordingly, in some embodiments, to minimize heat loss from heat exchanger 442 to ambient, an active grille shutter (AGS 493) is included and controlled to a closed position (e.g., to block air convection through heat exchanger 442). In some embodiments, the illustrative cycle of configuration 1100 results in compressor work equal to combined cabin and ESS heating capacity (e.g., refrigerant-to-air heat rejection via heat exchanger 430 and refrigerant-to-coolant heat rejection via heat exchanger 454).

In an illustrative example, control circuitry 310 may perform step 508 of process 500, achieving either of configurations 900, 1000, or 1100 based on heating requirements. Table 2 illustrates control valve settings during step 508, for example.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system comprising:
a plurality of control valves configured to control a flow of a refrigerant in a vehicle, comprising a first control valve and a second control valve; and
control circuitry coupled to the plurality of control valves, configured to:
achieve a first configuration of the plurality of control valves wherein the refrigerant is recirculated by a compressor to increase a compressor outlet pressure of the refrigerant, wherein in the first configuration the refrigerant flows along a path comprising:
the first control valve that is fully open, and
the second control valve that is partially open to generate a pressure drop in the refrigerant; and
when the compressor outlet pressure reaches a predetermined threshold, achieve a second configuration of the plurality of control valves wherein the refrigerant is circulated to transfer heat to one or more thermal loads.

2. The system of claim 1, wherein the path comprises:
the compressor;
two heat exchangers configured to not heat cabin air in the first configuration; and
an accumulator.

3. The system of claim 1, wherein the path comprises:
the compressor;
a heat exchanger configured to not heat cabin air in the first configuration;
a battery system heat exchanger; and
an accumulator.

4. The system of claim 1, wherein the path is a first path, and wherein in the second configuration the refrigerant flows along a second path comprising:
a first heat exchanger configured to optionally heat cabin air;
a first subpath comprising a second heat exchanger that transfers heat from the refrigerant to the cabin air; and
a second subpath parallel to the first subpath and comprising a battery system heat exchanger.

5. The system of claim 1, wherein the path is a first path, and wherein in the second configuration the refrigerant flows along a second path comprising:
a first heat exchanger;
a first subpath comprising a second heat exchanger; and

TABLE 2

Illustrative control valve settings during step 508.

| | Control valve 438 | Control valve 450 | Control valve 451 | Control valve 452 | Control valve 453 |
|---|---|---|---|---|---|
| Configuration 900 | Closed | Open | Expansion | Expansion | Open |
| Configuration 1000 | Closed | Expansion | Open | Open | Expansion |
| Configuration 1100 | Expansion | Open | Expansion | Open | Expansion | a second subpath parallel to the first subpath and comprising a third heat exchanger that transfers heat from the refrigerant to a battery system of the vehicle.

6. The system of claim 1, wherein the path is a first path, and wherein in the second configuration the refrigerant flows along a second path comprising:
a first heat exchanger;
a first subpath comprising a second heat exchanger that transfers a first amount of heat from the refrigerant to cabin air; and
a second subpath parallel to the first subpath and comprising a second heat exchanger that transfers a second amount of heat from the refrigerant to a battery system of the vehicle.

7. The system of claim 1, wherein, in the second configuration:
the refrigerant flows along a first subpath comprising the first and second control valves arranged on opposite sides of a first heat exchanger; and
the refrigerant flows along a second subpath parallel to the first subpath, wherein the second subpath comprises another two control valves of the plurality of control valves arranged on opposite sides of a second heat exchanger.

8. The system of claim 1, wherein the path is a first path, and wherein in the second configuration the refrigerant flows along a second path comprising:
two control valves of the plurality of control valves that are fully open; and
another two control valves of the plurality of control valves that are partially open to generate a pressure drop in the refrigerant.

9. A system comprising:
a heat pump system configured to operate using a refrigerant in a vehicle, wherein the heat pump system comprises a first control valve and a second control valve; and
control circuitry configured to:
receive an indication to provide heat to at least one subsystem;
achieve a first configuration of the heat pump system in response to the indication, wherein the refrigerant is recirculated to increase a pressure of the heat pump system, wherein in the first configuration the refrigerant flows along a path comprising:
the first control valve that is fully open; and
the second control valve that is partially open to generate a pressure drop in the refrigerant; and
when the pressure reaches a predetermined threshold, achieve a second configuration of the heat pump system, wherein the refrigerant is circulated to transfer heat to the at least one subsystem of the vehicle.

10. The system of claim 9, wherein the heat pump system comprises:
a compressor configured to compress the refrigerant;
a plurality of control valves configured to achieve an open state, a closed state, and a variable expansion throttling state, wherein the plurality of control valves comprises the first control valve and the second control valve;
a plurality of heat exchangers configured to provide heat transfer with a cabin air system and a battery system; and
an accumulator comprising a volume configured to store the refrigerant.

11. The system of claim 9, wherein the path comprises:
a compressor of the heat pump system;
a heat exchanger, wherein a duct door configured to control a flow of cabin air through the heat exchanger is closed to prevent heat transfer to the cabin air;
a battery system heat exchanger; and
an accumulator of the heat pump system.

12. The system of claim 9, wherein the path is a first path, and wherein in the second configuration the refrigerant flows along a second path comprising:
a first heat exchanger configured to optionally heat cabin air;
a first subpath comprising a second heat exchanger, wherein a duct door configured to control a flow of the cabin air through the second heat exchanger is open to transfer heat from the refrigerant to the cabin air; and
a second subpath parallel to the first subpath and comprising a battery system heat exchanger.

13. The system of claim 9, wherein the path is a first path, and wherein in the second configuration the refrigerant flows along a second path comprising:
a first heat exchanger;
a first subpath comprising a second heat exchanger; and
a second subpath parallel to the first subpath and comprising a third heat exchanger coupled to a battery cooling system, wherein the third heat exchanger transfers heat from the refrigerant to the battery cooling system.

14. A method comprising:
receiving an indication to provide heat from a heat pump system to at least one subsystem;
achieving, using control circuitry, a first configuration of the heat pump system in response to the indication, wherein refrigerant is recirculated to increase a pressure of the heat pump system, and wherein achieving the first configuration comprises causing the refrigerant to flow along a path comprising:
a compressor of the heat pump system;
a first control valve of the heat pump system that is fully open;
a second control valve of the heat pump system that is partially open to generate a pressure drop in the refrigerant; and
when the pressure reaches a predetermined threshold, achieving, using the control circuitry, a second configuration of the heat pump system, wherein the refrigerant is circulated to transfer heat to the at least one subsystem of the vehicle.

15. The method of claim 14, wherein the heat pump system comprises:
the first and second control valves are each configured to achieve an open state, a closed state, and a partially open state;
a plurality of heat exchangers configured to provide heat transfer with a cabin air system and a battery system; and
an accumulator comprising a volume configured to store the refrigerant.

16. The method of claim 14, wherein the path further comprises:
a heat exchanger, wherein a duct door configured to control a flow of cabin air through the heat exchanger is closed to prevent heat transfer to the cabin air;
a battery system heat exchanger; and
an accumulator of the heat pump system.

17. The method of claim 14, wherein the path is a first path, and wherein achieving the second configuration comprises causing the refrigerant to flow along a second path comprising:

a first heat exchanger configured to optionally heat cabin air;

a first subpath comprising a second heat exchanger, wherein a duct door configured to control a flow of the cabin air through the second heat exchanger is open to transfer heat from the refrigerant to the cabin air; and a second subpath parallel to the first subpath and comprising a battery system heat exchanger.

18. The method of claim 14, wherein the path is a first path, and wherein achieving the second configuration comprises causing the refrigerant to flow along a second path comprising:

a first heat exchanger;

a first subpath comprising a second heat exchanger; and a second subpath parallel to the first subpath and comprising a third heat exchanger coupled to a battery cooling system, wherein the third heat exchanger transfers heat from the refrigerant to the battery cooling system.

* * * * *